US010224865B2

(12) United States Patent
Bauer et al.

(10) Patent No.: US 10,224,865 B2
(45) Date of Patent: Mar. 5, 2019

(54) MONOLITHIC BRACKET FOR FLAT ROOF MOUNTED PHOTOVOLTAIC MODULES

(71) Applicant: Unirac Inc., Albuquerque, NM (US)

(72) Inventors: Steve Bauer, Albuquerque, NM (US); Bill Vaught, Albuquerque, NM (US); Kim Weaver, Edgewood, NM (US); Caitlin Purigraski, Albuquerque, NM (US); Stacy Harris, Albuquerque, NM (US); Charles Stubbs, Tijeras, NM (US); David Saenz Alvarez, Albuquerque, NM (US)

(73) Assignee: Unirac Inc., Albuquerque, NM (US)

( * ) Notice: Subject to any disclaimer, the term of this patent is extended or adjusted under 35 U.S.C. 154(b) by 0 days.

(21) Appl. No.: 15/192,173

(22) Filed: Jun. 24, 2016

(65) Prior Publication Data

US 2017/0373632 A1   Dec. 28, 2017

(51) Int. Cl.
*E04D 13/18* (2018.01)
*H02S 20/24* (2014.01)
*H02S 30/10* (2014.01)
*F16B 5/00* (2006.01)
*F16B 5/12* (2006.01)
*F24S 25/636* (2018.01)
*F24S 25/15* (2018.01)
*F24S 25/16* (2018.01)
*F24S 25/00* (2018.01)
*F24S 25/60* (2018.01)

(52) U.S. Cl.
CPC ............ *H02S 20/24* (2014.12); *F16B 5/0072* (2013.01); *F16B 5/121* (2013.01); *F16B 5/125* (2013.01); *F24S 25/15* (2018.05); *F24S 25/16* (2018.05); *F24S 25/636* (2018.05); *H02S 30/10* (2014.12); *F24S 2025/013* (2018.05); *F24S 2025/02* (2018.05); *F24S 2025/6007* (2018.05)

(58) Field of Classification Search
CPC .. H02S 20/24; H02S 30/10; F16B 1/00; F16B 2001/0064
USPC ......................................... 52/173.3; 136/251
See application file for complete search history.

(56) References Cited

U.S. PATENT DOCUMENTS

| | | | |
|---|---|---|---|
| 4,677,248 A * | 6/1987 | Lacey | F24J 2/5211 126/569 |
| 6,105,316 A * | 8/2000 | Bottger | F24J 2/5237 126/623 |
| 7,260,918 B2 | 8/2007 | Liebendorfer | |
| 7,434,362 B2 | 10/2008 | Liebendorfer | |
| 7,780,472 B2 | 8/2010 | Lenox | |
| 8,156,697 B2 | 4/2012 | Miros et al. | |
| 8,181,926 B2 | 5/2012 | Magno, Jr. et al. | |
| 8,234,824 B2 | 8/2012 | Botkin et al. | |
| 8,266,848 B2 | 9/2012 | Miros et al. | |

(Continued)

*Primary Examiner* — Basil S Katcheves
(74) *Attorney, Agent, or Firm* — Crowell & Moring LLP

(57) ABSTRACT

An integral, monolithic mounting bracket supports a corner of a photovoltaic module. The bracket includes a ballast tray for holding one or more ballast blocks, and includes a plurality of monolithic support legs that are disposed at acute angles from a plane of the ballast tray and that are integral with the ballast tray. The bracket can be manufactured by stamping at least two identical sections of metal from the sheet and then bending-up each section on its remaining uncut fourth side into a near-vertical position, so that each bent-up section forms a monolithic support leg.

10 Claims, 45 Drawing Sheets

(56) References Cited

U.S. PATENT DOCUMENTS

| | | | |
|---|---|---|---|
| 8,291,653 B2 | 10/2012 | Suarez et al. | |
| 8,413,944 B2 | 4/2013 | Harberts et al. | |
| 8,430,372 B2 | 4/2013 | Haddock | |
| 8,475,185 B2 | 7/2013 | Rivera et al. | |
| 8,505,864 B1 | 8/2013 | Taylor et al. | |
| 8,615,939 B2 | 12/2013 | Seery et al. | |
| 8,635,818 B2 * | 1/2014 | Wildes | F24J 2/5237 136/251 |
| 8,640,400 B2 | 2/2014 | Liebendorfer | |
| 8,740,163 B1 | 6/2014 | Taylor et al. | |
| 8,746,646 B2 | 6/2014 | Fluhrer et al. | |
| 8,748,733 B2 | 6/2014 | Leary | |
| 8,801,349 B2 | 8/2014 | McPheeters | |
| 8,813,441 B2 | 8/2014 | Rizzo | |
| 8,844,215 B2 | 9/2014 | Wildes et al. | |
| 8,850,754 B2 | 10/2014 | Rizzo | |
| 8,869,471 B2 | 10/2014 | Wildes et al. | |
| 8,875,453 B2 | 11/2014 | Kanczuzewski et al. | |
| D718,703 S | 12/2014 | Rizzo | |
| D718,704 S | 12/2014 | Rizzo | |
| D723,455 S * | 3/2015 | Luconi | D13/102 |
| 8,984,819 B1 | 3/2015 | Yang et al. | |
| 9,003,726 B2 | 4/2015 | Sader | |
| 9,010,043 B2 | 4/2015 | Kanczuzewski et al. | |
| 9,032,673 B2 | 5/2015 | Kanczuzewski et al. | |
| 9,038,329 B2 | 5/2015 | Pelman et al. | |
| 9,052,123 B2 | 6/2015 | Anderson et al. | |
| 9,057,542 B2 | 6/2015 | Schuit et al. | |
| 9,087,947 B2 | 7/2015 | Kanczuzewski et al. | |
| 9,106,023 B2 | 8/2015 | Schaefer et al. | |
| 9,142,700 B2 | 9/2015 | Meine et al. | |
| 9,145,906 B2 | 9/2015 | Schuit et al. | |
| 9,157,619 B1 * | 10/2015 | Newton | F16B 1/00 |
| 9,160,273 B2 | 10/2015 | Schuit et al. | |
| 9,166,522 B1 | 10/2015 | Zvanut et al. | |
| 9,175,878 B2 | 11/2015 | Kemmer et al. | |
| 9,194,611 B2 * | 11/2015 | Khowaiter | F24J 2/5245 |
| 9,196,755 B2 | 11/2015 | Wildes | |
| 9,214,891 B2 | 12/2015 | Dickey | |
| 9,249,925 B2 | 2/2016 | Roensch et al. | |
| 2009/0320904 A1 | 12/2009 | Botkin et al. | |
| 2010/0089390 A1 | 4/2010 | Miros et al. | |
| 2010/0219304 A1 * | 9/2010 | Miros | F24J 2/5205 248/125.8 |
| 2010/0275975 A1 | 11/2010 | Monschke et al. | |
| 2011/0108083 A1 * | 5/2011 | Ravestein | F24J 2/5237 136/244 |
| 2011/0138585 A1 | 6/2011 | Kmita et al. | |
| 2011/0278411 A1 * | 11/2011 | Carbonare | F24J 2/5239 248/237 |
| 2012/0036799 A1 * | 2/2012 | Kneip | F24J 2/523 52/173.3 |
| 2012/0097816 A1 * | 4/2012 | Tamm | H02S 20/30 248/309.1 |
| 2012/0223032 A1 * | 9/2012 | Rothschild | F24J 2/5237 211/41.1 |
| 2014/0010616 A1 | 1/2014 | Meine et al. | |
| 2014/0060625 A1 * | 3/2014 | Beuke | F24J 2/5211 136/251 |
| 2014/0096462 A1 | 4/2014 | Haddock | |
| 2014/0102016 A1 * | 4/2014 | Hemingway | F24J 2/5256 52/173.3 |
| 2014/0130847 A1 | 5/2014 | West et al. | |
| 2014/0174511 A1 | 6/2014 | West et al. | |
| 2014/0290716 A1 | 10/2014 | Stubbs | |
| 2014/0311552 A1 | 10/2014 | Garrett | |
| 2015/0040969 A1 * | 2/2015 | Wildes | H02S 20/00 136/251 |
| 2015/0171786 A1 | 6/2015 | Worden | |
| 2015/0214884 A1 | 7/2015 | Rizzo | |
| 2015/0249423 A1 | 9/2015 | Braunstein et al. | |
| 2015/0256120 A1 | 9/2015 | Anderson et al. | |
| 2015/0288320 A1 | 10/2015 | Stearns et al. | |
| 2015/0311606 A1 | 10/2015 | Meine et al. | |
| 2015/0311854 A1 | 10/2015 | Goehringer et al. | |
| 2016/0056753 A1 * | 2/2016 | Atchley | H02S 20/23 136/251 |
| 2016/0111997 A1 | 4/2016 | Ganshaw et al. | |

* cited by examiner

MONOLITHIC BRACKET FOR FLAT ROOF MOUNTED PHOTOVOLTAIC MODULES

CROSS-REFERENCE TO RELATED APPLICATIONS

Cross-reference is made to U.S. patent application Ser. No. 15/138,018 to Schuit et al., filed Apr. 25, 2016, U.S. patent application Ser. No. 15/138,030 to Schuit et al., also filed Apr. 25, 2016, and U.S. patent application Ser. No. 15/172,735, also to Schuit et al., filed Jun. 3, 2016.

BACKGROUND OF THE INVENTION

The solar industry is growing world-wide and, as a result, more-efficient structures are desirable for mounting photovoltaic modules to a structure, such as a roof of a home or other building. Whereas many different structures are known, there is a desire to reduce the complexity of such structures, and improve the efficiency of such structures. This can be achieved, in one respect, through the use of integrated, one-piece structures. Among the many different structures mentioned, known arrangements and elements used to mount and support photovoltaic modules include those disclosed by U.S. Pat. Nos. 7,260,918, 7,434,362, and 8,640,400 to Liebendorfer, U.S. Pat. No. 8,291,653 to Suarez et al., U.S. Pat. Nos. 9,057,542, 9,145,906, and 9,160,273 to Schuit et al., and U.S. Pat. No. 9,249,925 to Roensch et al., as well as by U.S. Patent Application Publication 2014/0290716 to Stubbs and U.S. Patent Application Publication 2016/0111997 to Ganshaw et al.

SUMMARY OF THE INVENTION

An integral, monolithic mounting bracket for supporting a corner of a photovoltaic module is disclosed. The bracket includes a ballast tray for holding one or more ballast blocks, and comprises a plurality of monolithic support legs that are disposed at an acute angle from a plane of the ballast tray and that are integral with the ballast tray. The bracket can be manufactured by stamping at least two identical sections of metal from the sheet and then bending-up each section on its remaining uncut fourth side into a near-vertical position, whereby each bent-up section forms a monolithic support leg.

DETAILED DESCRIPTION OF THE INVENTION

Figure 1A:
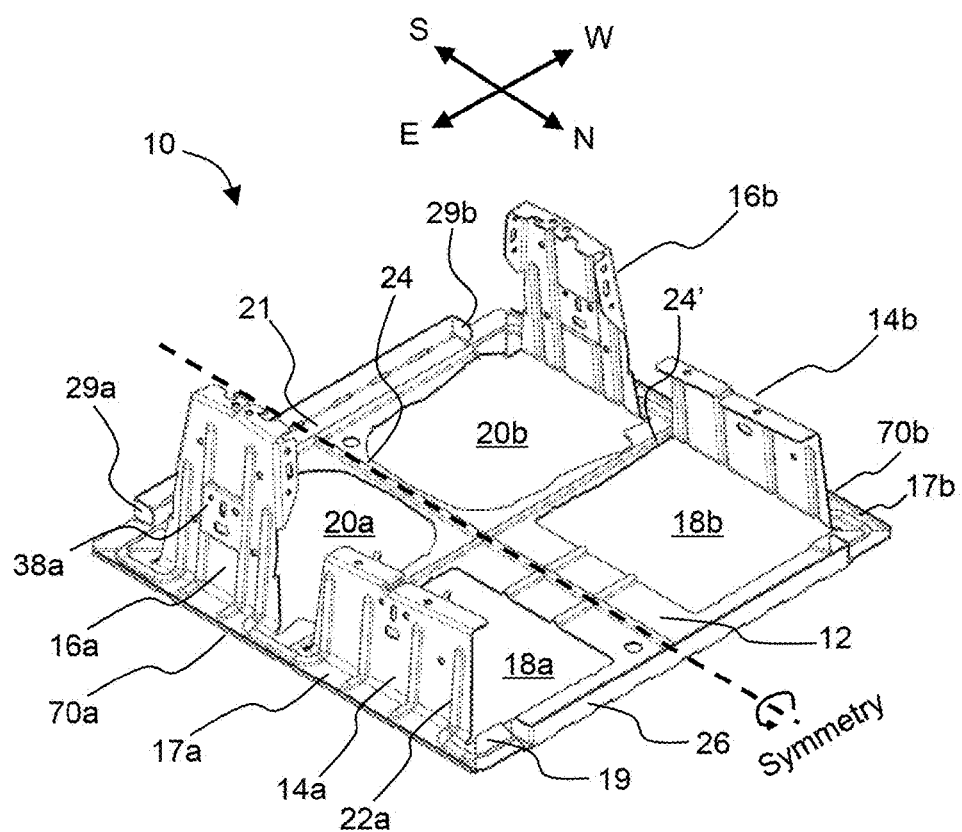
FIG. 1A shows a perspective view of a first embodiment of an integral, monolithic mounting bracket ("South-5"), according to the present invention.

The present invention relates to structures and methods for mounting arrays of photovoltaic modules (i.e., solar panels) on to a flat roof, e.g., a commercial roof or on to substantially flat ground, using mounting brackets that are ballasted (weighted down) with ballast blocks (e.g., concrete blocks or other dead weight). In this sense, the mounting structures are non-penetrating (i.e., they don't penetrate the roof's surface with lag screws) and non-adhesive (no adhesive is required). Typically, the mounting structures are made of metal, steel, galvanized steel, coated/painted steel, or aluminum, aluminum alloy, anodized aluminum alloy, but they can also be made of plastic or plastic composite (e.g., vacuum molded or injection molded). A preferred material is 16 Gauge galvanized steel sheet metal having a thickness=0.0625 inches.

To reduce costs and reduce installation time, it is desirable to minimize the number of individual parts in a structural mounting system, to reduce costs and reduce installation time. The present invention minimizes the number of parts by making the mounting brackets out of a single piece of sheet metal or plastic (not including the module mounting clamps and nuts/bolts). In this invention the mounting brackets are monolithic, single-piece, integral constructions. Although an integral construction can be achieved by welding or joining separate individual plates together, or via 3-D additive printing, a preferred approach is to stamp and cut-out shapes in sheet metal along three sides and then bend-up (pop-up) the cut-out shapes along a straight line on the fourth side. After stamping out and bending-up (popping-up) the support legs, a plurality of negative cut-out shapes are left over in the original sheet. Each leftover negative cut-out shape closely matches a corresponding shape of each support leg that has been stamped out and bent-up (i.e., before any mounting tabs or other tabs have been bent downwards on the support legs). The remaining, leftover metal that is not cut-out from the stamping process leaves a ballast tray, comprising a continuously-interconnected web of supporting surfaces that hold the ballast blocks in a compact and secure configuration. The ballast tray can have a plurality of turned-up edges around the perimeter for increasing bending stiffness and for additionally securing the ballast blocks.

It is also desirable to minimize shipping costs by having identical, stackable parts that can be stacked vertically in a closely nested set (i.e., stack). This can be achieved by using acute angles (i.e., angles that are less than 90 degrees) between the support legs and the plane of the ballast tray (See FIG. 4A, acute angle=$\beta$). In some embodiments, the acute angle, $\beta$, can range from 75-89 degrees; with a preferred acute angle being 85 degrees.

Because of natural symmetries that exist in a regular array of rectangular PV modules, the geometry of the mounting brackets of the present invention can have one or two planes of symmetry that are: oriented perpendicular to the plane of the ballast tray, and are located in a middle of the ballast tray. The planes of symmetry can be oriented in three different ways: (a) parallel to a first direction (e.g., the East-West direction); (b) parallel to a second direction (e.g., the North-South direction), which is perpendicular to the first direction, or (c) both.

In some embodiments of the present invention, an integral, monolithic mounting bracket for mounting one or more photovoltaic modules to a support surface can comprise: (a) a ballast tray for holding one or more ballast blocks; and (b) a plurality of integral, monolithic support legs that are disposed at an acute angle from a plane of the ballast tray. In some embodiments, the support legs are stamped-out and bent-up from the ballast tray at the acute angle (e.g. 75-89 degrees).

In other embodiments, the support legs are bent-up at 90 degrees (perpendicular) to the ballast tray. However, the brackets won't be stackable in this case.

The invention also provides for one or more methods of forming an integral, monolithic mounting bracket for mounting one or more photovoltaic modules to a support surface. In one embodiment, the method of formation can comprise the following steps:

(a) providing a rectangular-shaped sheet of metal, the sheet defining a plane;

(b) stamping and cutting-out at least two identical sections from the sheet of metal; with each section cut along three sides, leaving an uncut fourth side remaining, in a pattern that leaves a continuous rim along the outside of a perimeter of the sheet; and (c) bending-up (popping-up) each section on its remaining uncut fourth side into a near-vertical position, whereby each bent-up section forms an integral support leg having an acute angle with the plane of the sheet.

This example of a method of manufacture can further comprise:

(d) bending-down a plurality of mounting tabs into a position that is perpendicular to the tab's corresponding support leg; and (e) drilling a hole through each mounting tab that receives a bolt of a clamping assembly.

The stamping process can further comprise stamping out a plurality of horizontal and vertical stiffening ribs in the ballast tray and support legs, respectively. All corners are formed with radiused corners to prevent sharp edges and reduce stress concentrations.

Similar reference numbers are used in multiple drawings to indicate the same part or feature.

FIG. 1A shows a perspective view of a first embodiment of an integral, monolithic mounting bracket ("South_5"), according to the present invention. Note: ballast blocks are not shown. The integral, monolithic mounting bracket 10 for mounting one or more photovoltaic modules (not shown) to a support surface (not shown) can comprise: (a) a ballast tray 12 for holding one or more ballast blocks; and (b) a plurality of monolithic support legs 14a, 14b, 16a, 16b that are disposed at an acute angle, β, from a plane of the ballast tray 12 and that are integral with the ballast tray. The support legs 14a, 14b, 16a, 16b are stamped and cut-out from the base sheet of metal 12, and then folded-up (i.e., bent-up, popped-up) to form the final acute angle, β. This process leaves a 1-to-1, matching set of corresponding leftover "negative" cut-out shapes 18a, 18b, 20a, 20b, respectively, wherein each cut-out shape substantially matches a corresponding bent-up shape of each support leg (before any mounting tabs have been bent downwards). The acute angle, β, can range from 75 to 89 degrees, and a preferred acute angle, β, is 85 degrees.

After stamping-out and bending-up the support legs 14a, 14b, 16a, 16b, a continuous rim is left over disposed around the perimeter of the ballast tray 12. This rim is defined by connected rim segments 17a, 19, 17b, and 21. On the North and South edges of bracket 10, a pair of East-West vertical edges 26 and 28 (i.e., fences, lips) are turned-up, which form rigid edges that constrain the edges of the ballast blocks (not shown) and prevent them from sliding out. The remaining metal in the base tray 12 (base metal left over after stamping and cutting-out the support leg shapes) serves to support the ballast blocks. Horizontal stiffening ribs 24, 24', etc. are provided to increase bending stiffness of the leftover metal in ballast tray 12.

Vertical stiffening ribs 22a, 22b, etc. are provided to increase bending stiffness of the bent-up support legs 14a, 14b, respectively. Bent-up edges 26 and 28 further comprise pairs of end tabs 29a, 29b, and 31a, 31b that are bent-over at 90 degrees to the long segment, which provide additional stiffness and improved alignment of the ballast blocks. On the East and West edges of bracket 10, a pair of North-South edges 70a, 70b (i.e., fences) are turned-up, which serve to stiffen the edges of ballast tray 12. Bracket 10 is symmetric across a plane of symmetry that: is oriented perpendicular to the plane of the ballast tray, is oriented parallel to a first direction (i.e., the North-South direction), and is located in a middle of the ballast tray. This plane of symmetry defines a first symmetric pair of short support legs 14a and 14b; and a second symmetric pair of tall support legs 16a and 16b. In other words, short support leg 14b is a mirror image of short support leg 14a; and tall support leg 16b is a mirror image of tall support leg 16a.

Figure 1B:
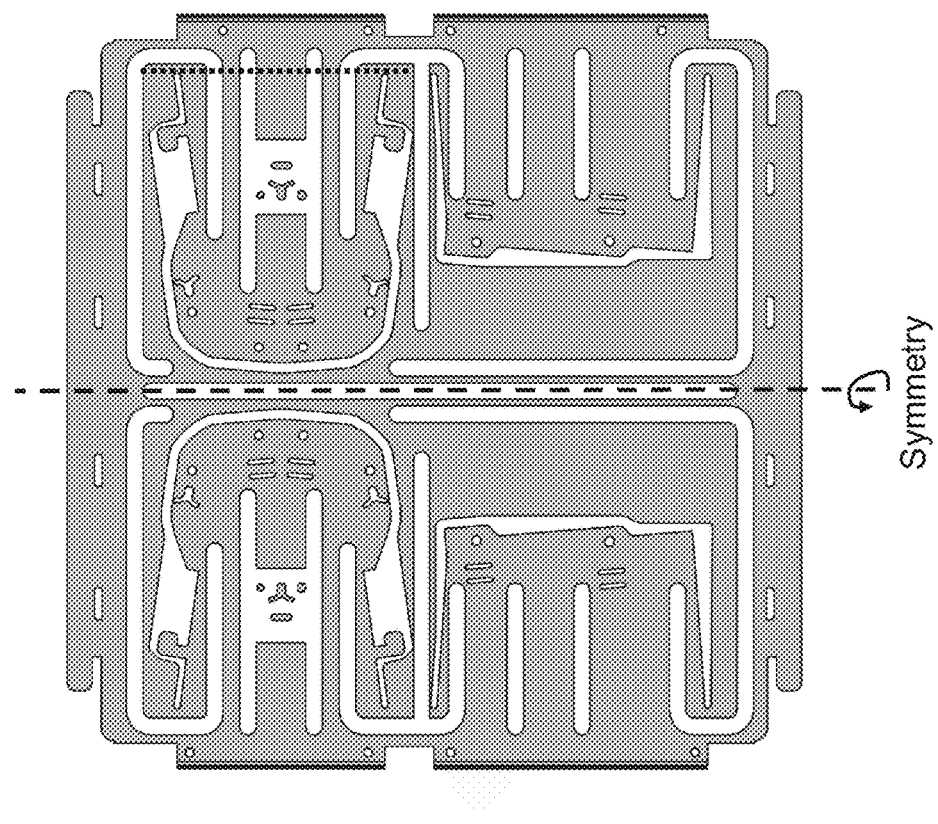
FIG. 1B shows top plan view of a first embodiment of a flat cut-sheet pattern mask for an integral, monolithic mounting bracket ("South-5"), according to the present invention.

FIG. 1B shows top plan view of a first example of a flat, cut-sheet pattern mask for an integral, monolithic mounting bracket ("South-5"), according to the present invention. The remaining sections of metal that are not bent-up comprise ballast tray 12. The cutting of the flat shapes of metal can be accomplished by stamping (shearing), laser cutting, plasma-arc cutting, or water-jet cutting.

Figure 1C:
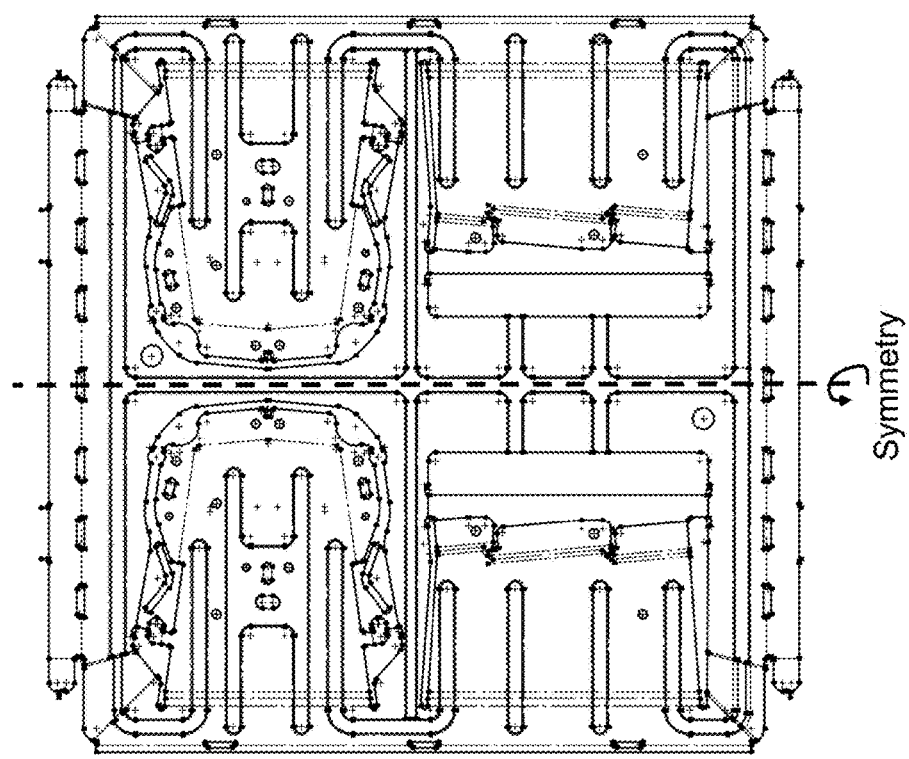
FIG. 1C shows top plan view of a first embodiment of a flat cut-sheet pattern mask for an integral, monolithic mounting bracket ("South-5"), according to the present invention.

FIG. 1C shows top plan view of the first example of a flat cut-sheet pattern mask for an integral, monolithic mounting bracket ("South_5"), according to the present invention. In this view, dashed lines represent the folding lines for bending-up the sections of metal (after being stamped out).

Figure 2:
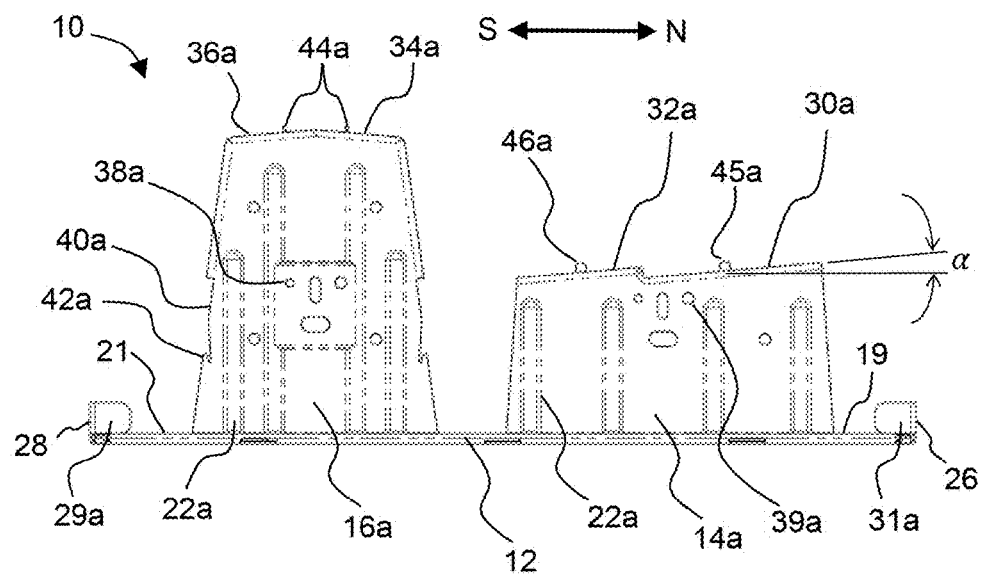
FIG. 2 shows a side elevational view of a first embodiment of an integral, monolithic, mounting bracket ("South-5"), according to the present invention.

FIG. 2 shows a side elevational view of the first embodiment of an integral, monolithic mounting bracket ("South-5"), according to the present invention. Note: ballast blocks are not shown. The South (tall) support leg 16a is approximately twice as tall as the North (short) support leg 14a. Each support leg has four vertical stiffening ribs 22a. The North support leg 14a comprises a pair of mounting tabs 30a and 32a, which are oriented at the same small tilt angle, α, with respect to the horizontal plane of the ballast tray 12. The small tilt angle, α, can range from 0 to 15 degrees, with a preferred angle being 5 degrees. The South support leg 16a comprises an adjacent pair of mounting tabs, 34a and 36a, which are tilted at opposite small tilt angles, +/−α, with respect to each other. The purpose of the negative tilt angle for mounting tab 34a is for the last row on the North end of a PV array, where the whole bracket 10 itself is rotated 180 degrees; this allows the lower support leg 14a to be "tucked under" and hidden underneath the Northern-most PV module, so that no portion of bracket 10 sticks-out from underneath the PV module. This allows for a cleaner installation on the North row. A plurality of mounting holes (e.g., holes 38a, 39a) are disposed on the support legs 14a and 16a, for mounting accessory items, such as wire management clips. A thin, vertical recess 40a is disposed on each lateral edge of the vertical wall of the South support leg, 16a, and a corresponding hook feature 42a, 42a' is disposed at the bottom end of each vertical recess 40a. The purpose of this feature (42a, 42a') is to grab and lock onto the lower end of a wind deflector panel (not shown) without the use of any fasteners (i.e., nuts or bolts/screws). PV modules are aligned to bracket 10 using spacing tabs (i.e., tangs) 45a, 46a, 46b, and 44a, 44b located on the top of support legs 14a and 16a, respectively.

Figure 3:
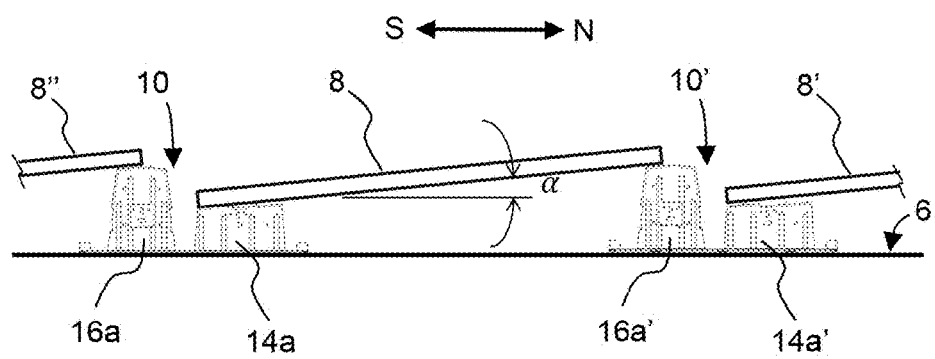
FIG. 3 shows a side elevational view of a first embodiment of an integral, monolithic mounting bracket ("South-5"), holding a series of PV modules in a North-South configuration, according to the present invention.

FIG. 3 shows a side elevational view of the first embodiment of an integral, monolithic mounting bracket ("South-5"), holding a series of PV modules in a North-South configuration, according to the present invention. Note: ballast blocks are not shown. A pair of North-South brackets 10, 10' are spaced apart in the N-S direction a distance approximately equal to the distance of one PV module on a supporting surface 6 (e.g., roof). Each PV module 8, 8', 8" is tilted at the small tilt angle, $\alpha$, of 5 degrees. The North end of PV module 8 rests on mounting tab 36a of the tall support leg (16a), while the South end of PV module 8 rests on mounting tab 30a (or 32a, depending on the desired spacing between modules 8 and 8') of the short support leg 14a. The support legs are sufficiently tall as to provide open space and good circulation of air underneath the PV modules. In particular, the minimum height of the short support legs 14a,b is selected to be tall enough so as to hold a standard concrete ballast block underneath the PV module 8, without the block touching the underside of the PV module.

Figure 4A:
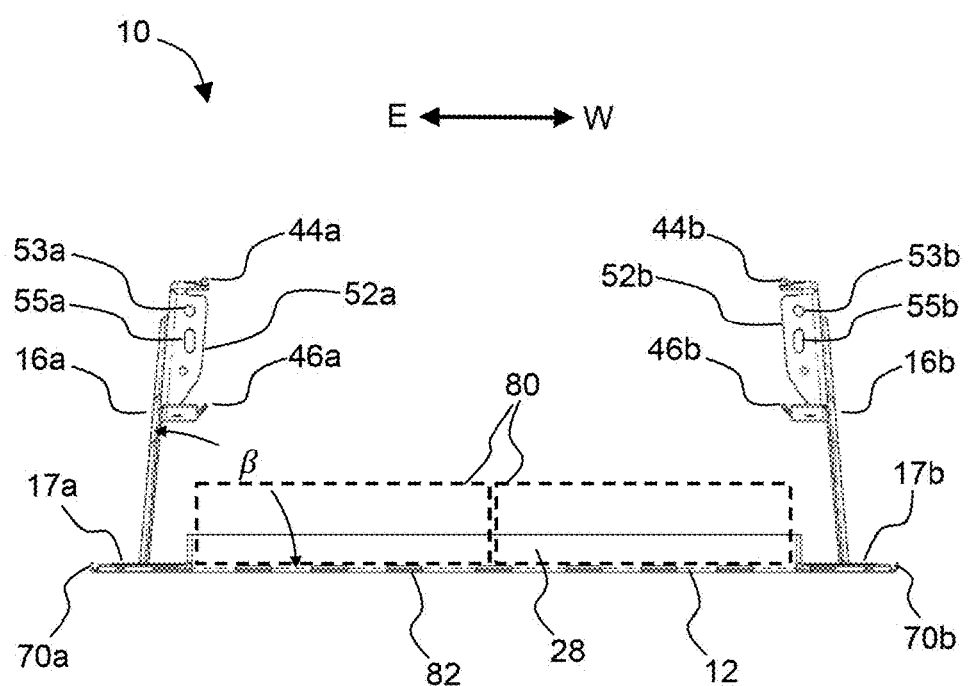
FIG. 4A shows an end elevational view of a first embodiment of an integral, monolithic mounting bracket ("South-5"), according to the present invention.

FIG. 4A shows an end elevational view of the first embodiment of an integral, monolithic mounting bracket ("South-5"), according to the present invention. Tall support legs 16a and 16b are disposed at an acute angle, $\beta$, with respect to the plane of the ballast support tray 12. Disposed on the upper edges of support legs 16a and 16b are side mounting flanges 52a and 52b, respectively. Each flange 52a and 52b comprises one or more mounting holes 53a,b and slots 55a,b. An example of two ballast blocks laid side-by-side 80 is shown; other configurations and number of blocks are possible, depending on the wind loading requirements for ballasting. A plurality of perforations 82 is shown along the fold-line of the turned-up edge 28, which serve as water drainage holes.

Figure 4B:
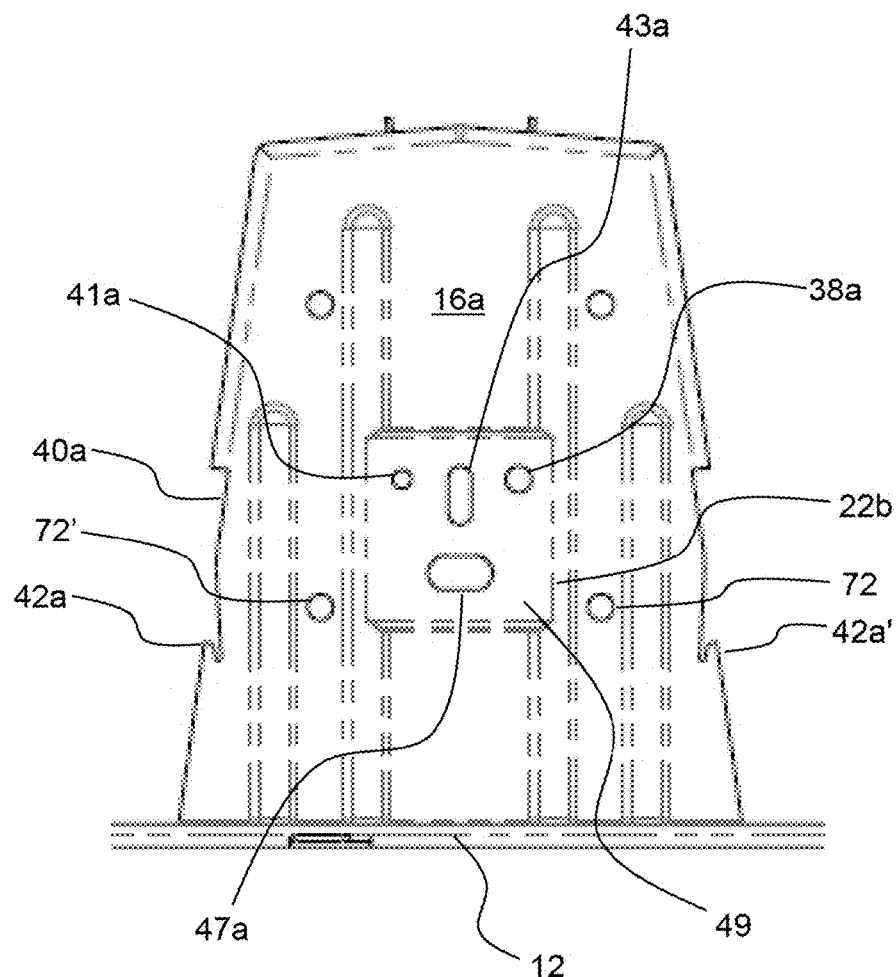
FIG. 4B shows a side elevational view of a close-up of a first embodiment of an integral, monolithic mounting ("South-5"), according to the present invention.

FIG. 4B shows a side elevational view of the close-up of a first embodiment of an integral, monolithic mounting ("South-5"), according to the present invention. Note: ballast blocks are not shown. This close-up view shows a tall support leg 16a. Located roughly in the middle of the support leg 16a is a rectangular mounting pad 49, which comprises a series of holes and slots. Hole 41a is sized to accept a #10 bolt. Hole 38a is sized to accept a ¼-inch bolt. Vertical slot 43a is sized to accept a proprietary wire management clip (see FIG. 41), and horizontal slot 47a is sized to accept a commercially-available Hayco, Inc. wire management clip (not shown). Holes 72, 72', etc. are sized to accept a temporary tooling ball that is used during the stamping and forming operations.

Figure 5:
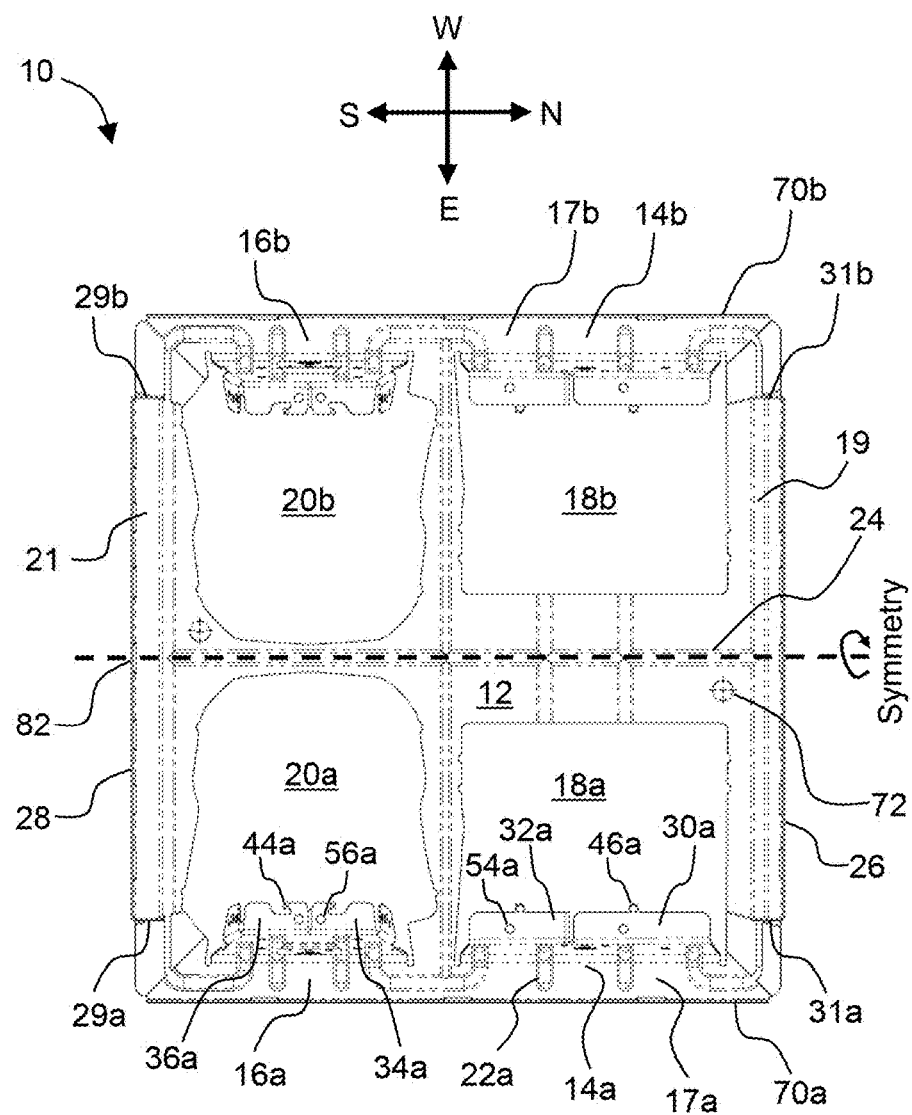
FIG. 5 shows a top plan view of a first embodiment of an integral, monolithic mounting bracket ("South-5"), according to the present invention.

FIG. 5 shows a top plan view of the first embodiment of an integral, monolithic mounting bracket ("South-5"), according to the present invention. Note: ballast blocks are not shown. The ballast tray 12 comprises a plurality of leftover, negative cut-out shapes 18a, 18b, 20a, and 20b, wherein each cut-out shape substantially matches a corresponding shape of each support leg (14a, 14b, 16a, and 16b, respectively) that is stamped and bent-up (before any mounting tabs have been bent downwards). The remaining, leftover metal 12 forms a continuously-connected web of metal 12 that forms the pan of ballast tray 12 and supports the ballast blocks. Mounting holes 54a, 56a are disposed in mounting tabs 32a, 34a, respectively and are sized to accept a bolt for holding a mid-clamp or end-clamp. Alignment tabs 46a and 44a help to align the PV module on bracket 10 during installation.

Figure 6:
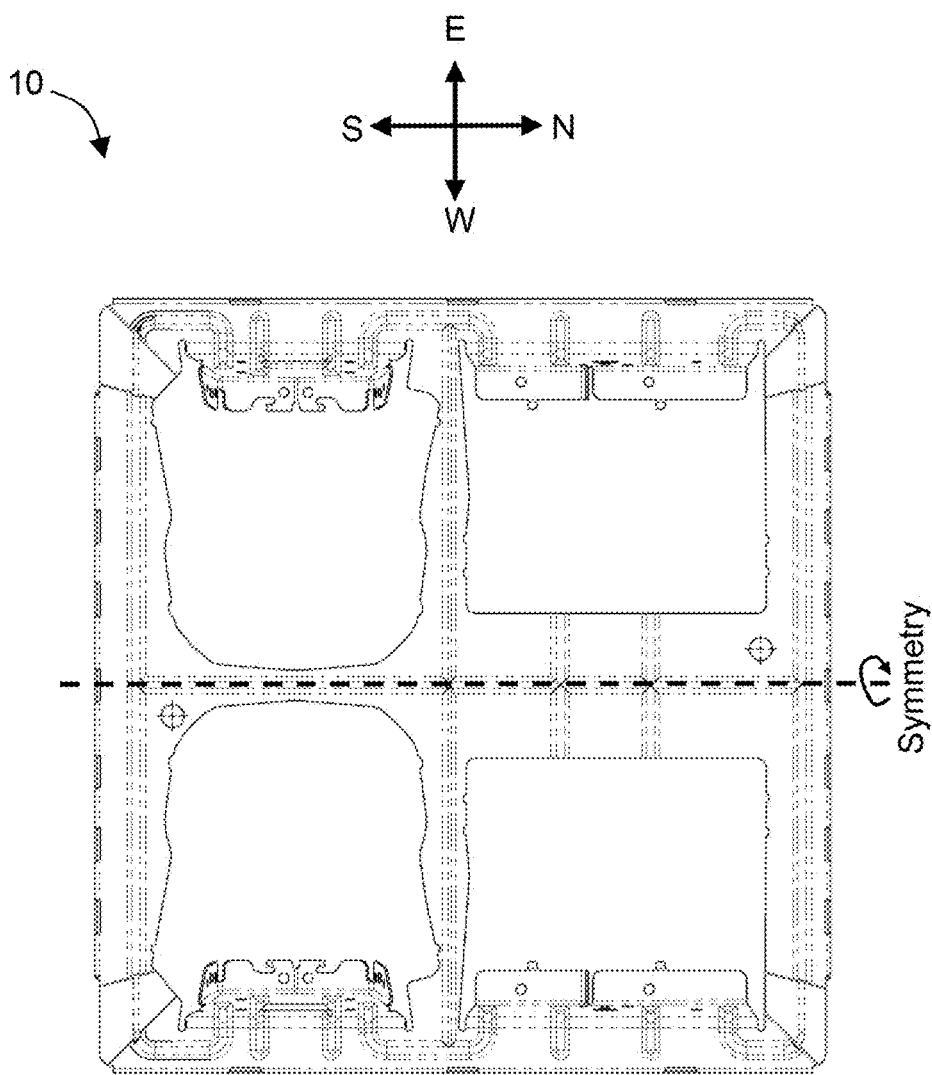
FIG. 6 shows a bottom plan view of a first embodiment of an integral, monolithic mounting bracket ("South-5"), according to the present invention.

FIG. 6 shows a bottom plan view of the first embodiment of an integral, monolithic mounting bracket ("South-5"), according to the present invention.

Figure 7:
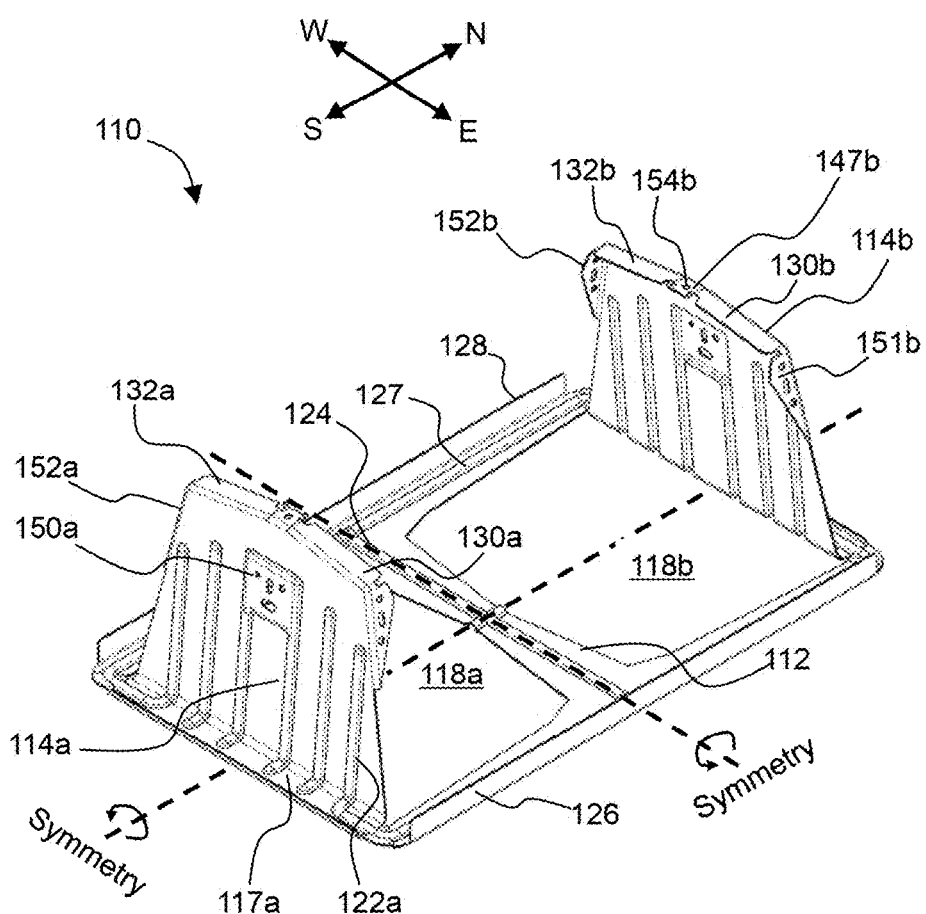
FIG. 7 shows a perspective view of a second embodiment of an integral, monolithic mounting bracket ("Ridge"), according to the present invention.

FIG. 7 shows a perspective view of a second embodiment of an integral, monolithic mounting bracket ("Ridge"), according to the present invention. This second embodiment is similar to the first embodiment of a monolithic mounting bracket, with the main exception being that the second embodiment comprises two different planes of symmetry that are oriented perpendicular (orthogonal) to each other. In FIG. 7, Ridge bracket 110 is symmetric across a plane of symmetry that: (a) is oriented perpendicular to the plane of the ballast tray 112, (b) is oriented parallel to a first direction (i.e., the North-South direction), and (c) is located in a middle of the ballast tray 112. Additionally, bracket 110 is symmetric across a plane of symmetry that: (a) is oriented perpendicular to the plane of the ballast tray 112, (b) is oriented parallel to a second direction (i.e., the East-West direction), and (c) is located in a middle of the ballast tray 112. Ridge bracket 110 comprises a single pair of symmetric support legs 114a and 114b, and each support leg 114a,b comprises a pair of mounting tabs 130a, 132a and 130b, 132b, respectively, that are disposed at opposite small dual-tilt angles (See FIG. 8 for more detail). A single mounting hole 154a and 154b is disposed at the top of each support leg 114a and 114b, respectively. Each support leg 114a and 114b comprises a pair of side mounting flanges 151a, 152a and 151b, 152b, respectively. Each side mounting flange 151a, 152a and 151b, 152b comprises a plurality of holes and slots for mounting accessory items, such as a wind deflector (not shown). Each support leg 114a,b comprises six vertical stiffening ribs 122a,b. A small, square flat portion (flat horizontally) 147a, 147b, defining a single mounting hole 154a, 154b, is disposed at the apex of support legs 114a,b, respectively. A pair of turned-up edges 126 and 128 projecting from respective ballast tray edge sections are disposed on the East and West ends of bracket 110, respectively. FIG. 7 also shows the ballast tray as having a rim segment 117a, leftover cut-out shapes 118a, 118b, and stiffening ribs 124, 127.

Figure 8:
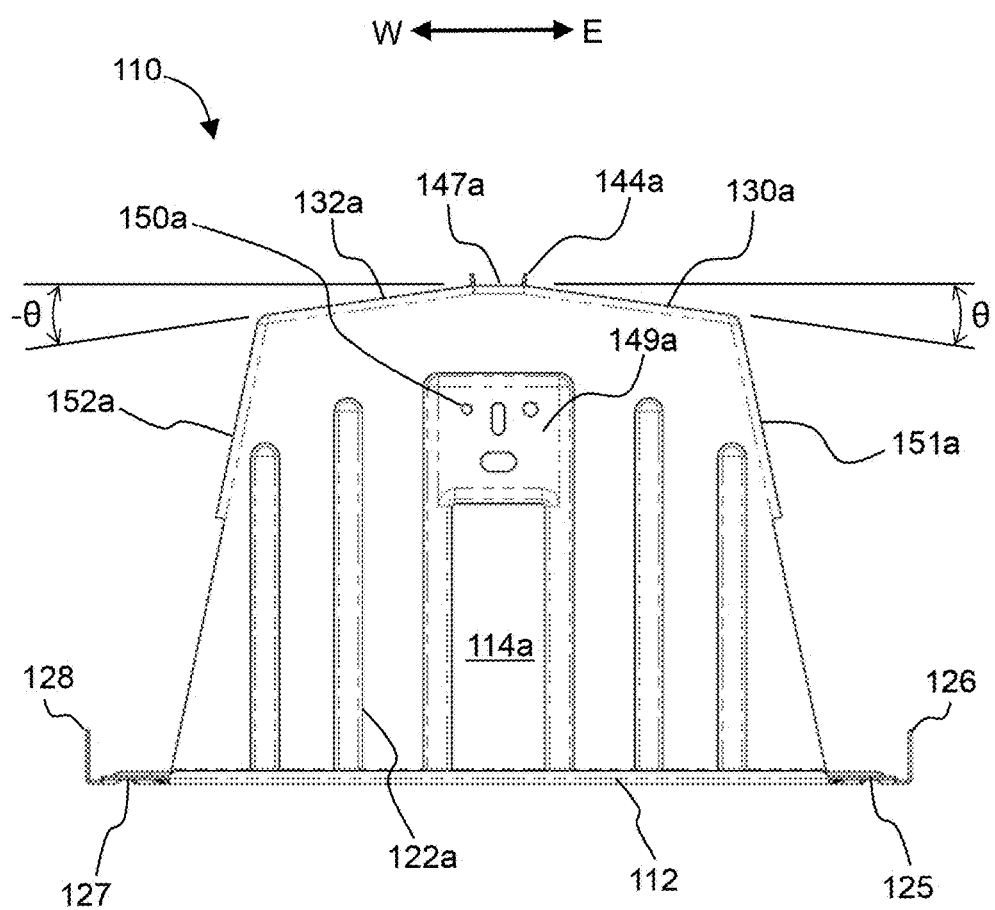
FIG. 8 shows a side elevational view of a second embodiment of an integral, monolithic mounting bracket ("Ridge"), according to the present invention.

FIG. 8 shows a side elevational view of a second embodiment of an integral, monolithic mounting bracket ("Ridge"), according to the present invention. Each support leg 114a, 114b comprises a pair of mounting tabs 130a, 132a, that are disposed at opposite small dual tilt angles, +/−$\theta$, where $\theta$ can range from 0 to 10 degrees (i.e., −10 degrees to +10 degrees). The pair of tabs 130a and 132a form a "ridge" shape (i.e., tent shape). PV modules are aligned to the bracket 110 using spacing tabs 144a, 144b located on the top of the support legs 114a, 114b. An optimum, preferred small dual-tilt angle is 8 degrees. A small, square flat portion (flat horizontally) 147a defining a single mounting hole 154a is disposed at the apex of support legs 114a. A pair of turned-up vertical edges (lips) 126 and 128 are disposed on the East and West ends of bracket 110, respectively. A mounting pad 149a is disposed roughly in an upper portion of the support leg 114a, and comprises a plurality of mounting holes and slots 150a, etc. FIG. 8 also provides a sectional view of stiffening ribs 125, 127 in the ballast tray edge sections adjacent the turned-up edges 126, 128, respectively.

Figure 9:
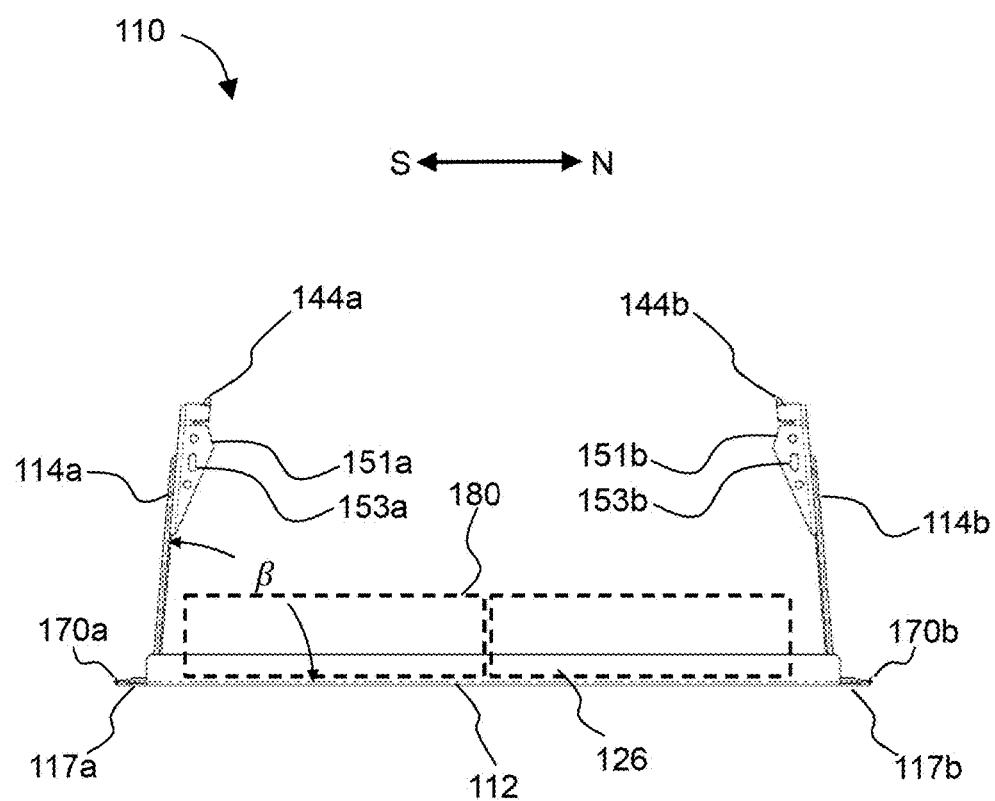
FIG. 9 shows an end elevational view of a second embodiment of an integral, monolithic mounting bracket ("Ridge"), according to the present invention.

FIG. 9 shows an end elevational view of the second embodiment of an integral, monolithic mounting bracket ("Ridge"), according to the present invention. In this view, the second embodiment is essentially identical to the first embodiment, with the exception that the N-S orientation is different than the E-W orientation of FIG. 4A. Also shown in FIG. 9 are spacing tabs 144a, 144b, mounting holes or slots 153a, 153b, rim segments 117a, 117b having respective edges 170a, 170b, and a pair of ballast blocks 180 laid side-by-side.

Figure 10:
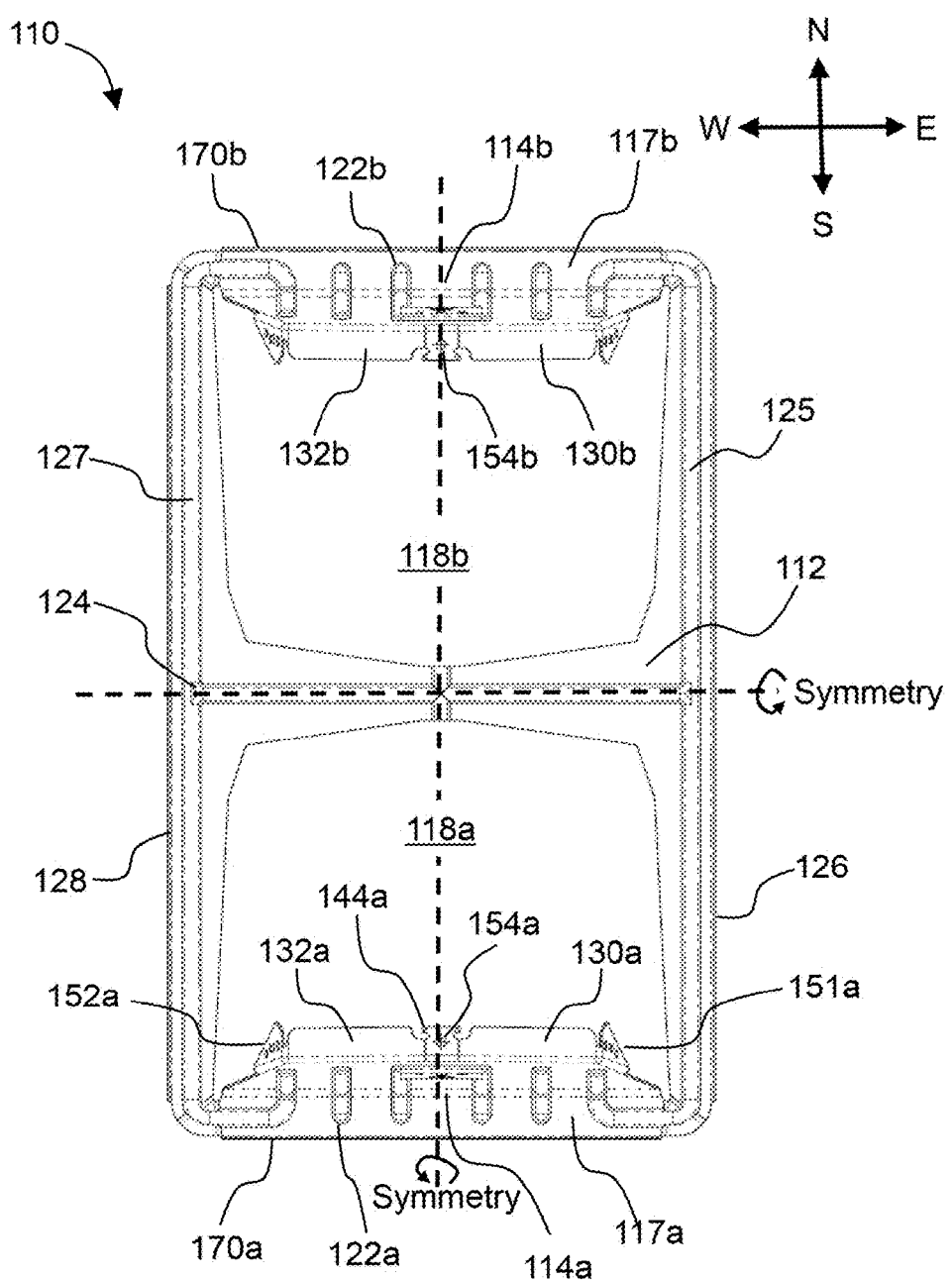
FIG. 10 shows a top plan view of a second embodiment of an integral, monolithic mounting bracket ("Ridge"), according to the present invention.

FIG. 10 shows a top plan view of the second embodiment of an integral, monolithic mounting bracket ("Ridge") shown in FIG. 8, according to the present invention. In this view, the second embodiment is essentially identical to the first embodiment shown in FIG. 5, with the exception that there are two orthogonal planes of symmetry for bracket 110 in FIG. 10.

Figure 11:
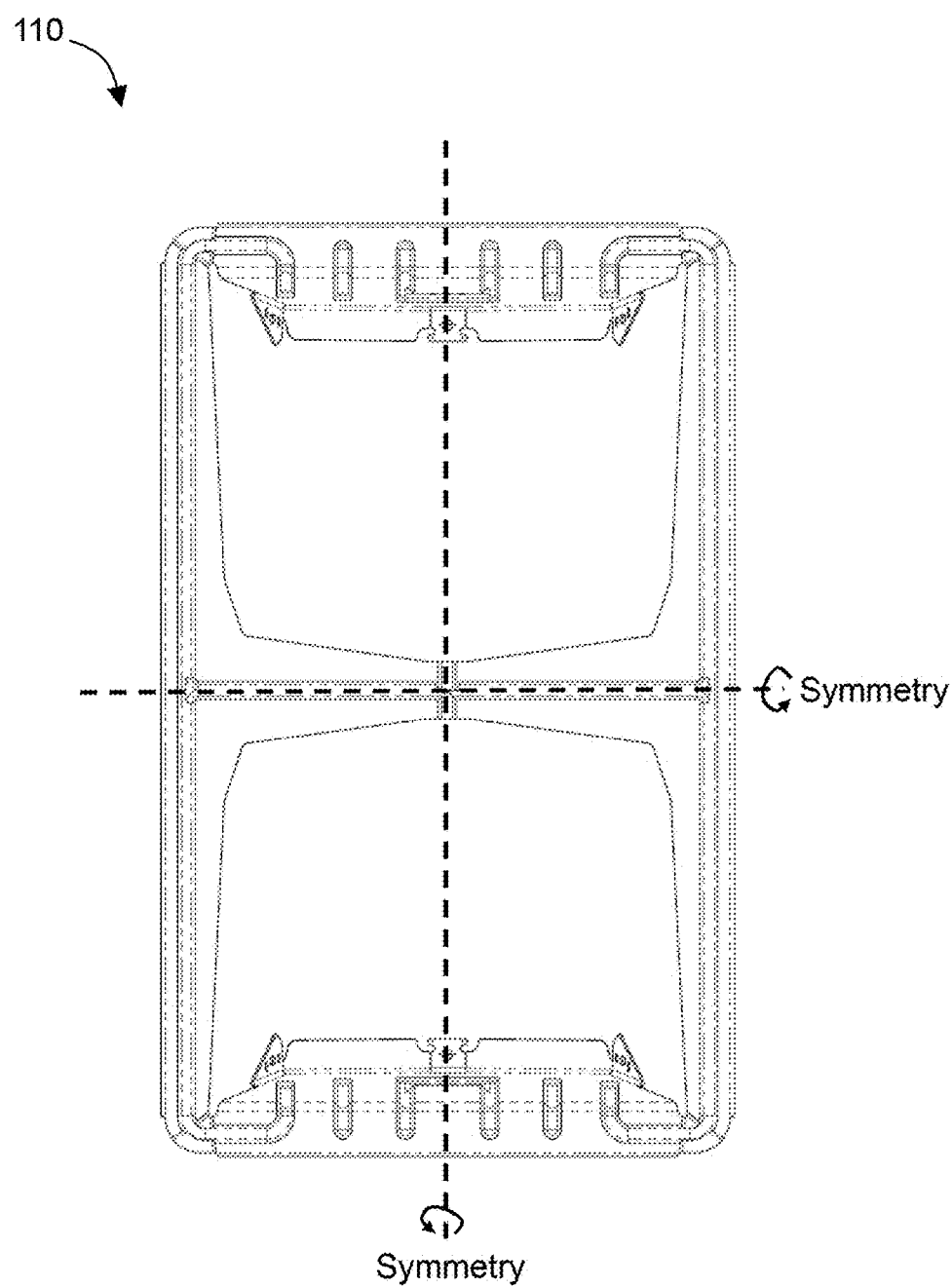
FIG. 11 shows a bottom plan view of a second embodiment of an integral, monolithic mounting bracket ("Ridge"), according to the present invention.

FIG. 11 shows a bottom plan view of the second embodiment of an integral, monolithic mounting bracket ("Ridge"), according to the present invention.

Figure 12:
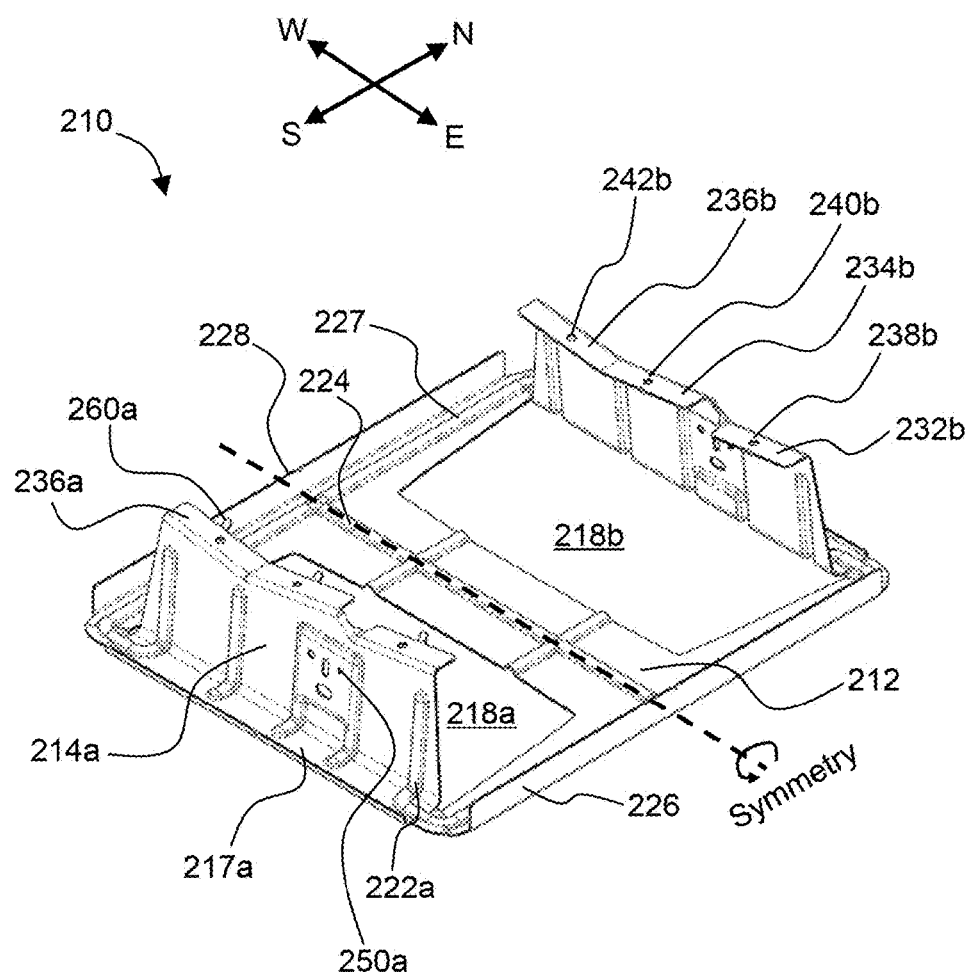
FIG. 12 shows a perspective view of a third embodiment of an integral, monolithic mounting bracket ("Valley"), according to the present invention.

FIG. 12 shows a perspective view of a third embodiment of an integral, monolithic mounting bracket ("Valley"), according to the present invention. This third embodiment is essentially identical to the second embodiment illustrated in FIG. 7, except that the third embodiment has a single plane of symmetry, which is parallel to a second direction (i.e., the East-West direction). Each support leg 214a, 214b comprises four vertical stiffening ribs 222a, 222b, respectively. The main difference with FIG. 7 are the mounting tabs 232a,b, 234a,b, and 236a,b. FIG. 12 also identifies negative cut-out shapes 218a, 218b defining openings in the ballast tray 212, a rim segment 217a, stiffening ribs 224, 227, vertical edges 226, 228, alignment holes 238b, 240b, and 242b defined in the mounting tabs 232b, 234b, and 236b, respectively, and an alignment tab 260a on the mounting tab 236a, all of which function in the same ways as analogous elements present in the previously described embodiments.

Figure 13:
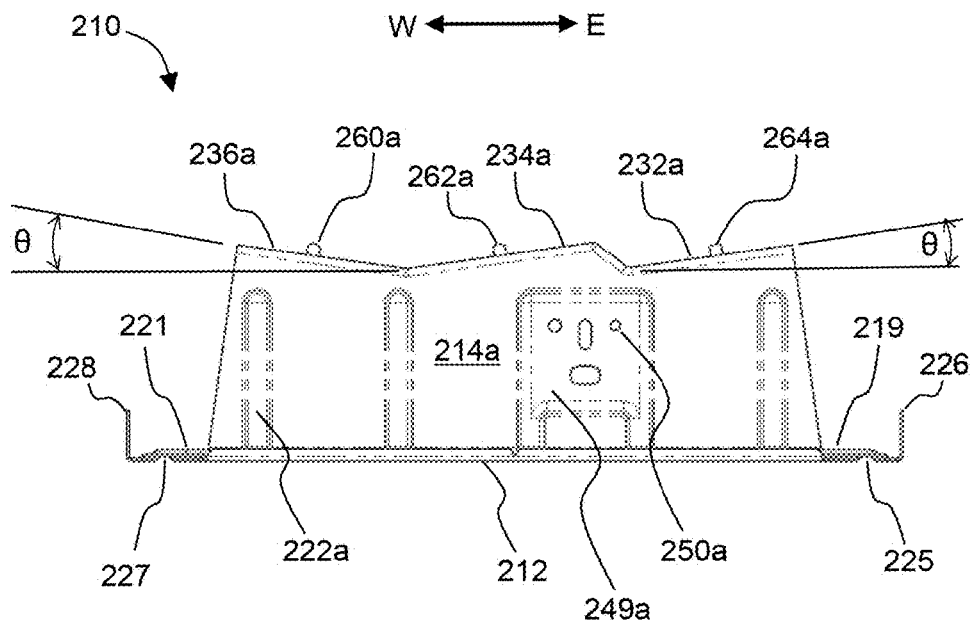
FIG. 13 shows a side elevational view of a third embodiment of an integral, monolithic mounting bracket ("Valley"), according to the present invention.

FIG. 13 shows a side elevational view of the third embodiment of an integral, monolithic mounting bracket 210 ("Valley"), according to the present invention. Two of the mounting tabs, 232a and 234a, are angled to the right (East) at the same positive dual-tilt angle, θ, which can range from 0 to 10 degrees, with a preferred angle of 8 degrees. The third mounting tab, 236a, is angled to the left (West) at the same positive dual-tilt angle, θ. The second and third mounting tabs 234a and 236a match up to form a "valley" in-between them, which permits its use in a "Dual-Tilt" configuration. Also visible in FIG. 13 are stiffening ribs 225, 227 and vertical edges 226, 228 at ballast tray edge sections 219, 221, respectively, one of the support legs 214a, extending upwardly from the ballast tray 212, having ribs 222a, a mounting pad 249a, and mounting holes or slots 250a in the mounting pad 249a, with alignment tabs 260a, 262a, and 264a respectively disposed on the mounting tabs 236a, 234a, and 232a.

Figure 14:
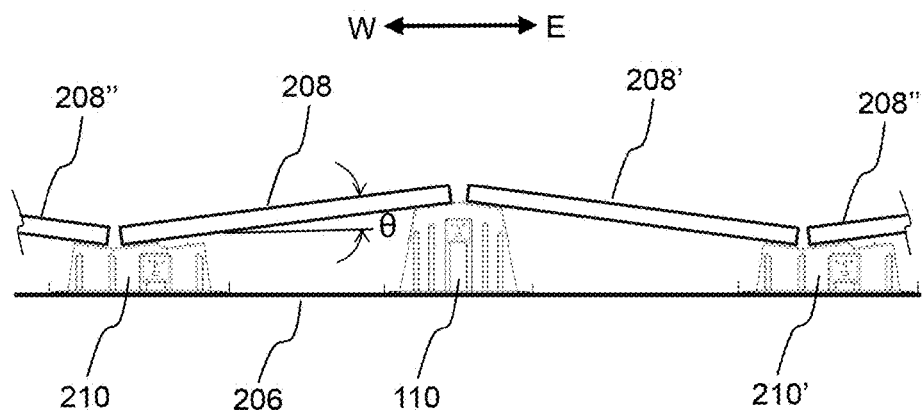
FIG. 14 shows a side elevational view of a second and third embodiment of an integral, monolithic mounting bracket ("Ridge" and "Valley"), holding a series of PV modules in an East-West "Dual-Tilt" configuration, according to the present invention.

FIG. 14 shows a side elevational view of the second and third embodiments of integral, monolithic mounting brackets 110 and 210 ("Ridge" and "Valley"), holding a series of PV modules in an East-West "Dual-Tilt" configuration, according to the present invention. PV module 208 is inclined at a dual-tilt angle, θ, which can range from 0 to 10 degrees, with a preferred angle of 8 degrees. This angle is related to the height of Ridge bracket 110 and Valley bracket 210. Typically, ridge bracket 110 is approximately twice as tall as Valley bracket 210. Use of a Dual-tilt design allows more PV modules to be packed into the same area on a roof, as compared to a traditional North-South design (as shown in FIG. 3), which optimizes power output. FIG. 14, of course, also shows a mounting surface 206, another Valley bracket 210', and additional PV modules 208', 208", appropriately positioned.

Figure 15:
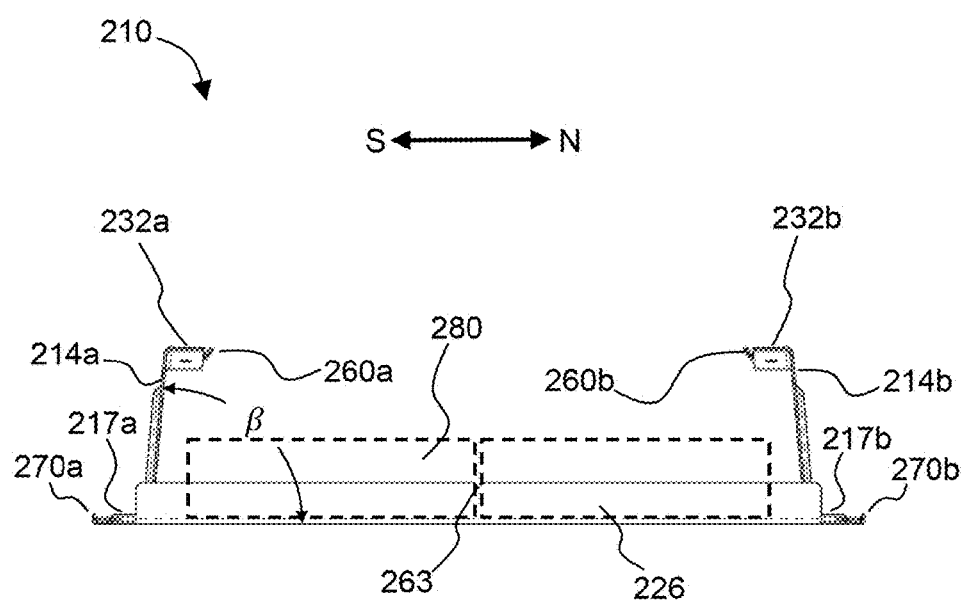
FIG. 15 shows an end elevational view of a third embodiment of an integral, monolithic mounting bracket ("Valley"), according to the present invention.

FIG. 15 shows an end elevational view of the third embodiment of an integral, monolithic mounting bracket 210 ("Valley"), according to the present invention. This view is essentially identical to the views shown for the first and second embodiments. A centerline mark 263 is placed at the middle of turned-up edge 226, as an installation aide. Rim segments 217a, 217b, ballast tray edges 270a, 270b, mounting tabs 232a, 232b, and a pair of PV modules 280 are also illustrated.

Figure 16:
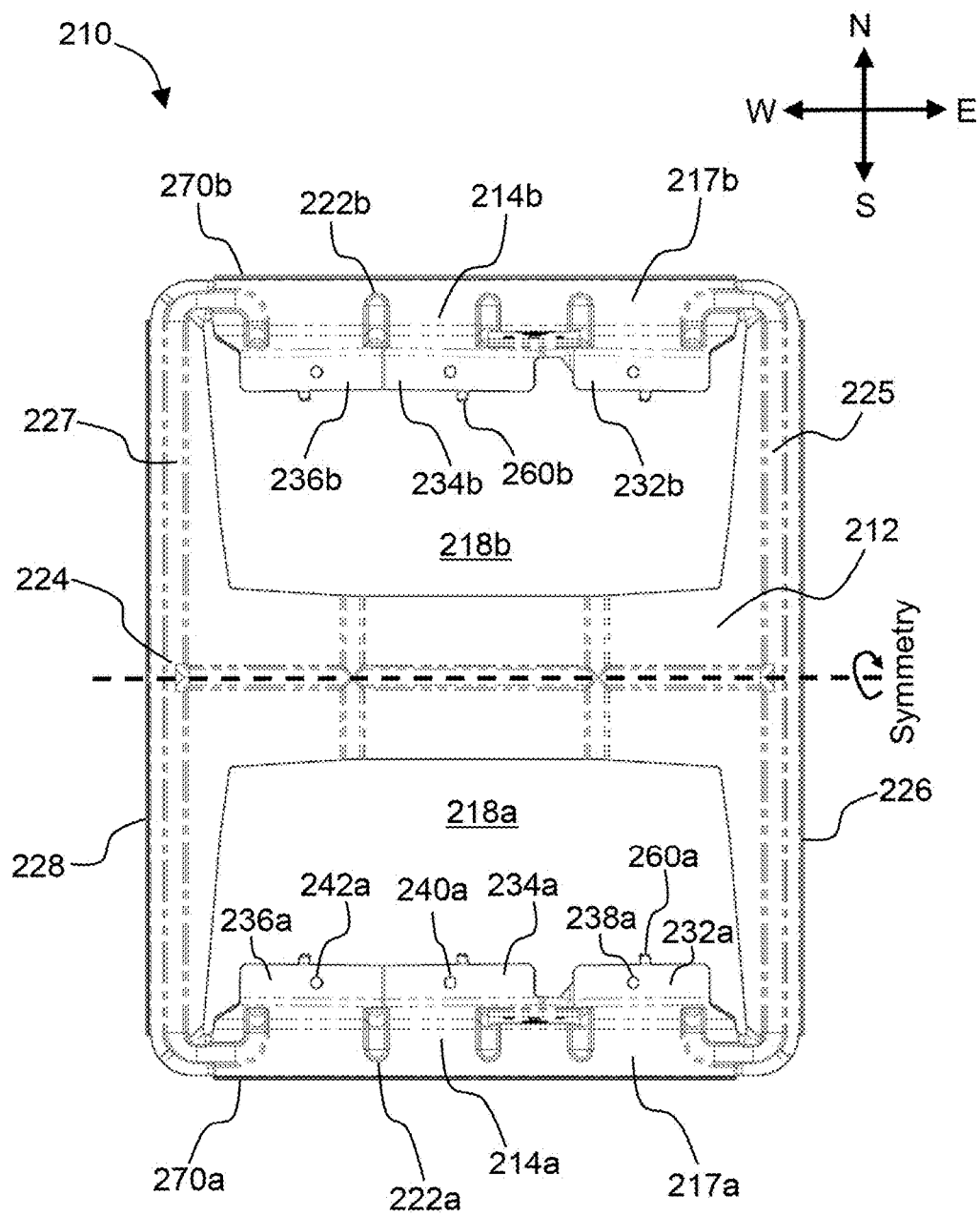
FIG. 16 shows a top plan view of a third embodiment of an integral, monolithic mounting bracket ("Valley"), according to the present invention.

FIG. 16 shows a top plan view of the third embodiment of an integral, monolithic mounting bracket 210 ("Valley"), according to the present invention. Alignment tabs 260a and 260b, etc. are used to help align the PV modules on bracket 210. Each mounting tab 232a, 234a, 236a, etc. defines a corresponding mounting hole 238a, 240a, 242a, etc. for accepting a bolt for a clamping assembly (not shown). Also shown in FIG. 16 are the support legs 214a, 214b, the stiffening ribs 222a, 222b, 224, 225, and 227, the rim segments 217a, 217b, the vertical edges 226, 228, ballast tray edges 270a, 270b, and negative cut-out shapes 218a, 218b in the ballast tray 212.

Figure 17:
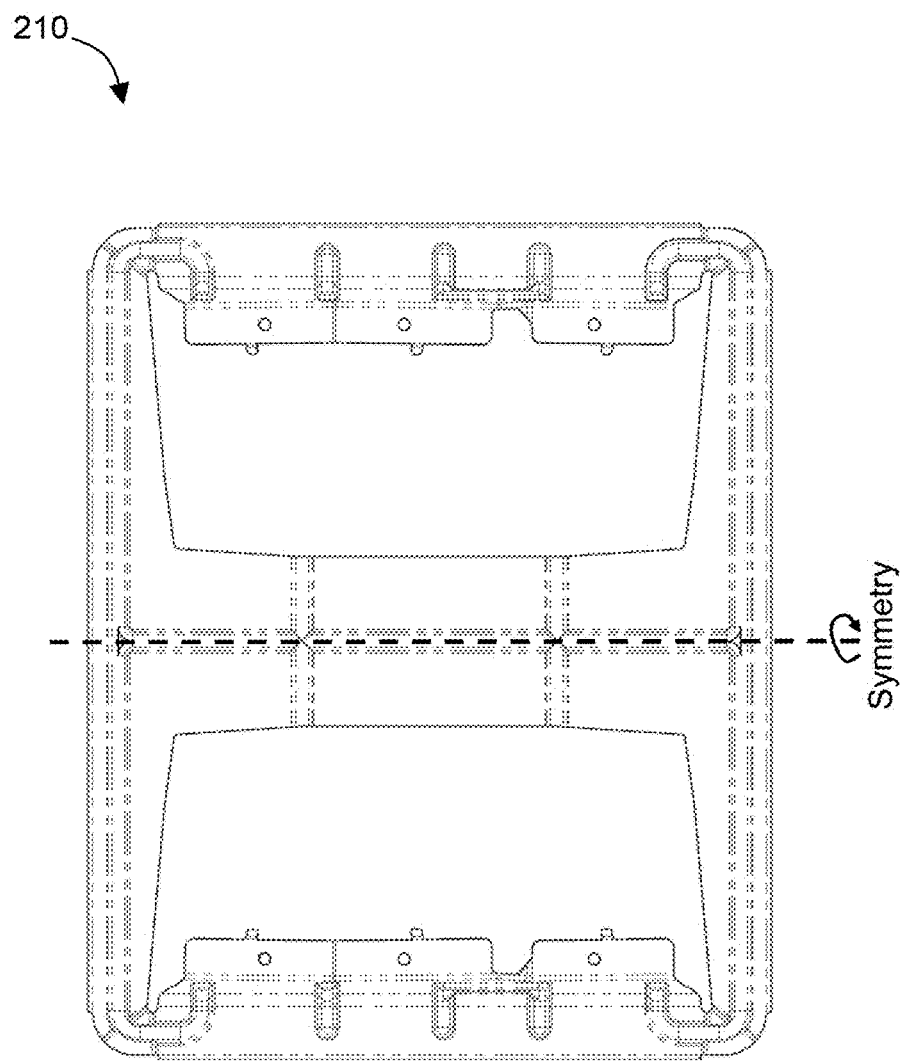
FIG. 17 shows a bottom plan view of a third embodiment of an integral, monolithic mounting bracket ("Valley"), according to the present invention.

FIG. 17 shows a bottom plan view of the third embodiment of an integral, monolithic mounting bracket 210 ("Valley"), according to the present invention.

PV modules are mounted to the brackets of the present invention by using mid-clamp and/or end-clamp assemblies. These clamping assemblies are generally made of stainless steel, for high strength and excellent corrosion-resistance. The clamps generally comprise one or more sharp points, sharp lines/edges, or serrations that serve to penetrate the anodized coating of an anodized aluminum substrate, which creates a good electrical contact and a good electrical bonding path between pairs of objects connected by the clamp. Mid-clamps are used to attach pairs of adjacent PV modules to the dual-tilt Ridge bracket 110, and end-clamps are used to attach single PV modules to both the South 5 bracket 10 and to the dual-tilt Valley bracket 210.

Figure 18:
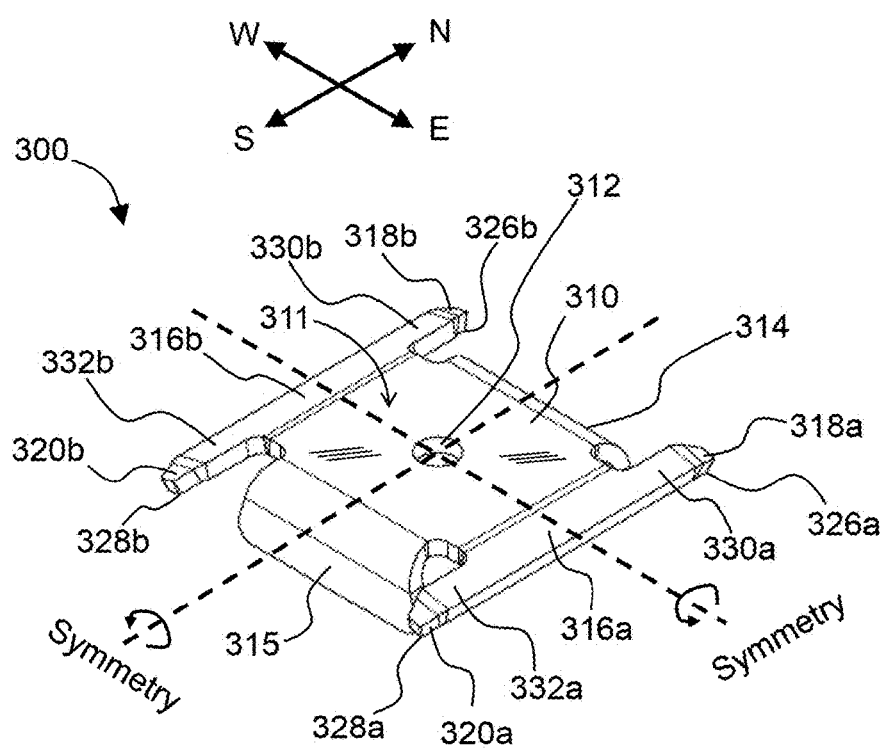
FIG. 18 shows an upper perspective view of a first embodiment of a mid-clamp, according to the present invention.

FIG. 18 shows an upper perspective view of a first embodiment of a mid-clamp 300, according to the present invention. Mid-clamp 300 is symmetric across two orthogonal planes. Mid-clamp 300 is a one-piece, monolithic structure comprising a flat, central plate (washer) 310 defining a central aperture 312 for receiving a threaded fastener; a pair of downfacing tabs 314, 315 located on opposite ends of plate 310; and a pair of two-pronged spring arms 316a and 316b disposed on opposite sides of plate 310. Downfacing tabs 314 and 315 serve to align and space-apart adjacent PV modules by a predetermined distance (e.g., 1⅜ inches). Disposed in opposite directions on each spring arm 316a and 316b are a pair of prongs 330a, 332a and 330b, 332b, respectively. Disposed at the distal ends of each prong 330a, 332a and 330b, 332b is a downturned end 318a, 320a and 318b, 320b, respectively. Each downturned end 318a, 320a and 318b, 320b has a truncated square shape and a plurality of sharp points 326a, 328a, and 326b, 328b, respectively, which serves to penetrate the anodized coating of an anodized aluminum substrate, thereby creating good electrical contact and a good electrical bonding path between pairs of objects connected by the mid-clamp 300. The upper face 311 of plate 310 can be seen in this view.

Figure 19:
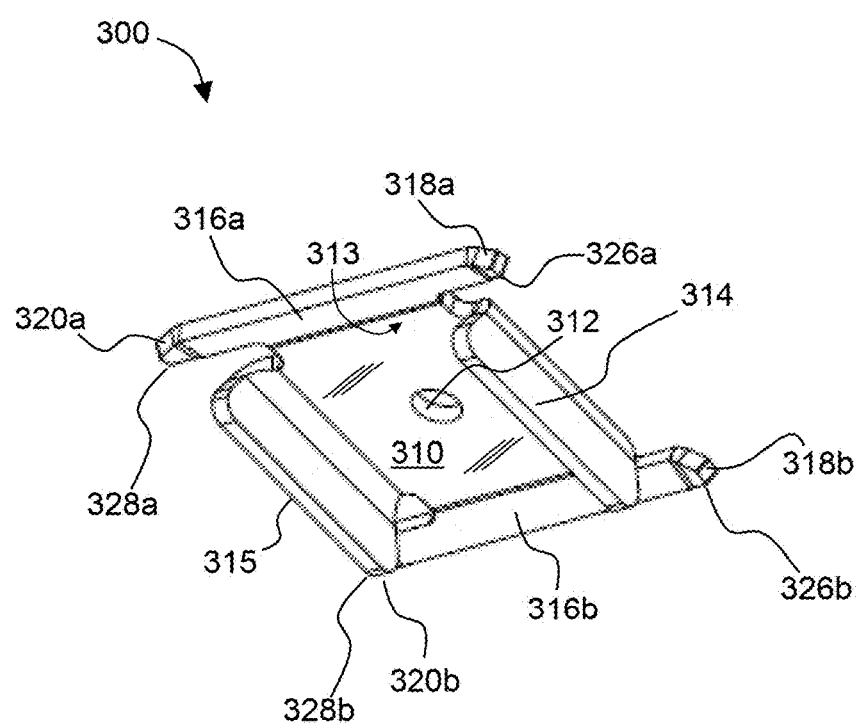
FIG. 19 shows a lower perspective view of a first embodiment of a mid-clamp, according to the present invention.

FIG. 19 shows a lower perspective view of the first embodiment of the mid-clamp 300, according to the present invention. Here, the lower face 313 of plate 310 can be seen. Also visible in FIG. 19 are the downfacing tabs 314, 315, the spring arms 316a, 316b, the downturned ends 318a, 320a, 318b, and 320b, the sharp points 326a, 326b, 328a, and 328b, and the central aperture 312.

Figure 20:
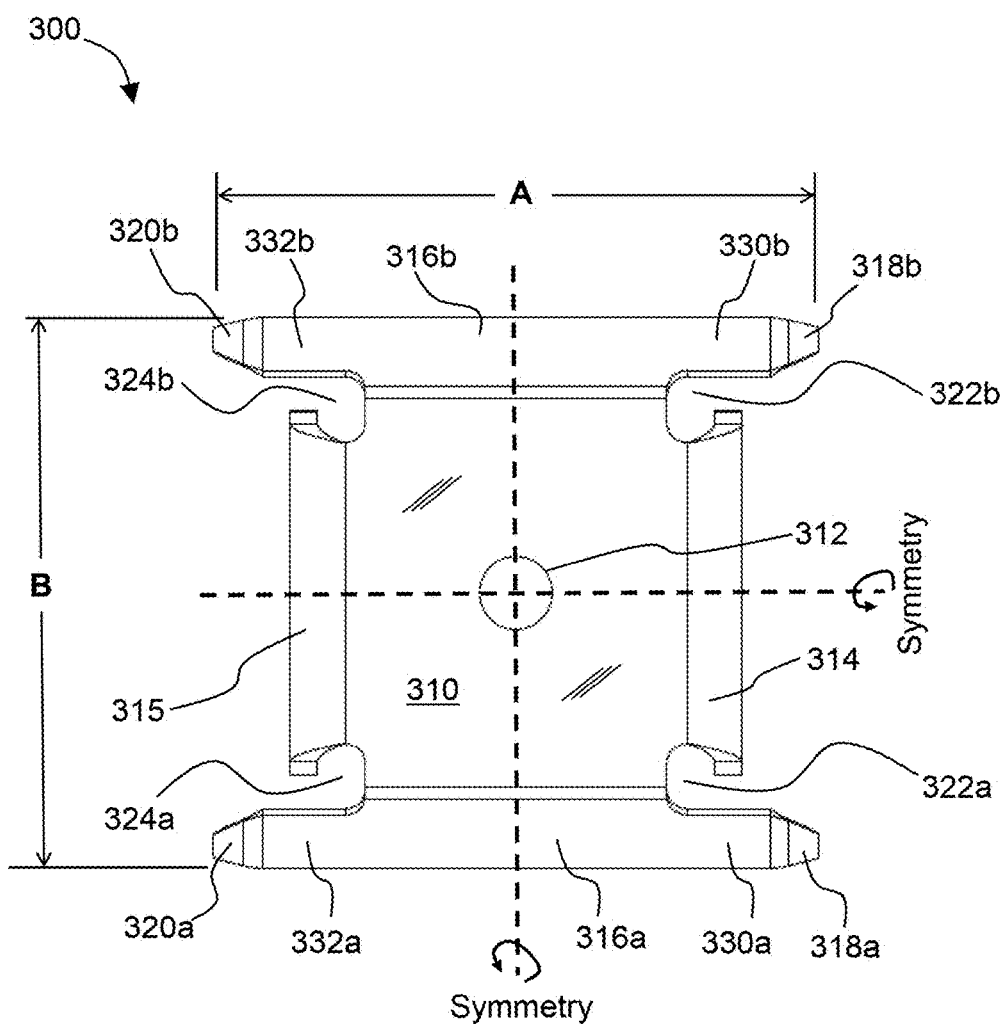
FIG. 20 shows a top plan view of a first embodiment of a mid-clamp, according to the present invention.

FIG. 20 shows a top plan view of the first embodiment of a mid-clamp, according to the present invention. The two widths, A and B, of mid-clamp 300 can be the same dimension, or different. In some embodiments, B can be greater than A by 10%-50% more. In other words, the ratio B/A can be less than or equal to 1.5. Disposed in-between the prongs 330a, 332a and 330b, 332b and plate 310 are semi-circular recesses 322a, 324a, 322b, 324b. These recesses serve to reduce stress concentrations in the clamping plate 310 when clamp 300 is loaded. The central aperture 312, the downfacing tabs 314, 315, the spring arms 316a, 316b, and the downturned ends 318a, 320a, 318b, and 320b are also indicated.

Figure 21:
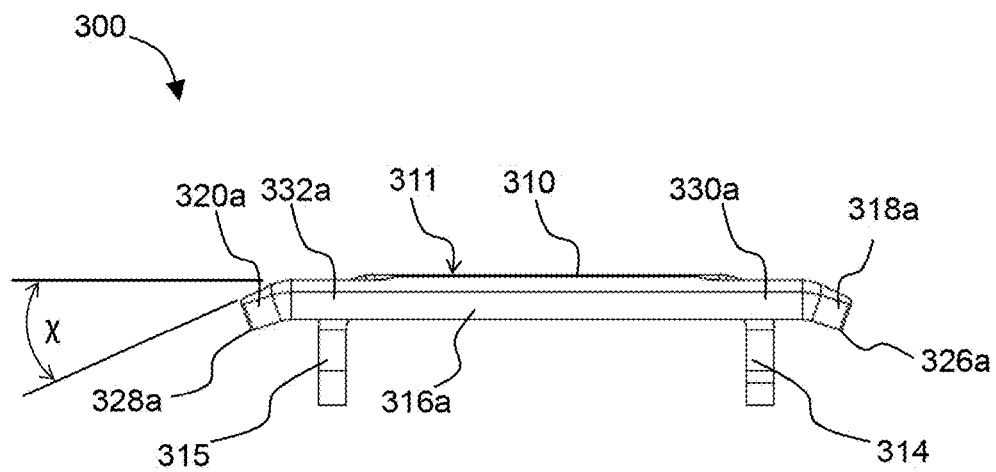
FIG. 21 shows a side elevational view of a first embodiment of a mid-clamp, according to the present invention.

FIG. 21 shows a side elevational view of the first embodiment of a mid-clamp 300, according to the present invention. Downturned ends 318a, 320a and 318b, 320b are tilted at an angle, $\chi$, with respect to the plane of plate 310, which can range, for example, from 20-40 degrees, with a preferred angle being 30 degrees. Tilting down the ends 318a and 320a at the angle, $\chi$, causes the distal, truncated square end to be tipped (angled) on edge, which creates sharp points 326a and 328a, respectively, which penetrate an anodized coating. Upper face 311 of the flat central plates 310, the downfacing tabs 314, 315, a spring arm 316a, and prongs 330a, 332a are also identified.

Figure 22A:
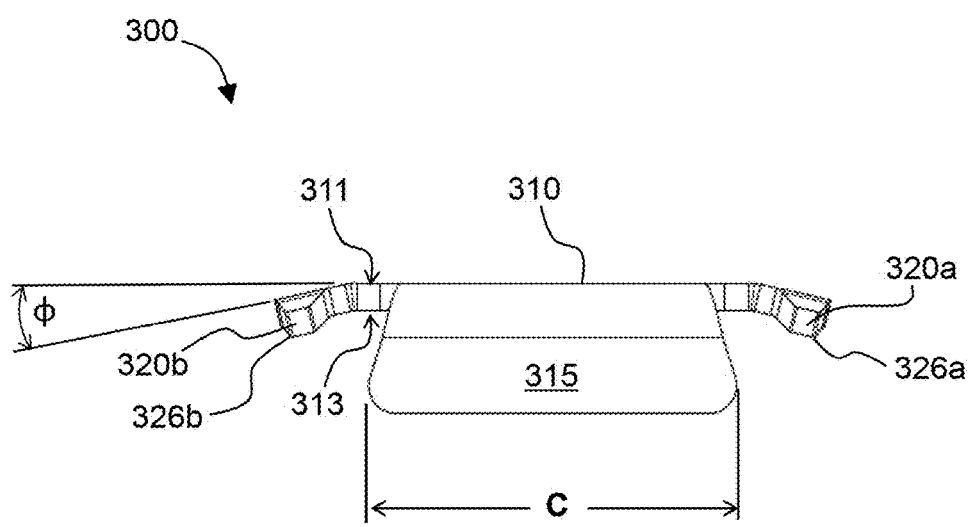
FIG. 22A shows an end elevational view of a first embodiment of a mid-clamp, according to the present invention.

FIG. 22A shows an end elevational view of a first embodiment of a mid-clamp, according to the present invention. The pair of spring arms 316a and 316b are tilted down at an angle, $\phi$, with respect to the plane defined by the upper face 311 of plate 310, which can range, for example, from 10-30 degrees, with a preferred angle being 20 degrees. The dimension, C, can range from 1 to 1.5 inches, with a preferred distance being 1⅜ inches. The lower face 313, one downfacing tab 315, downturned ends 320a, 320b, and sharp points 326a, 326b are also indicated.

Figure 22B:
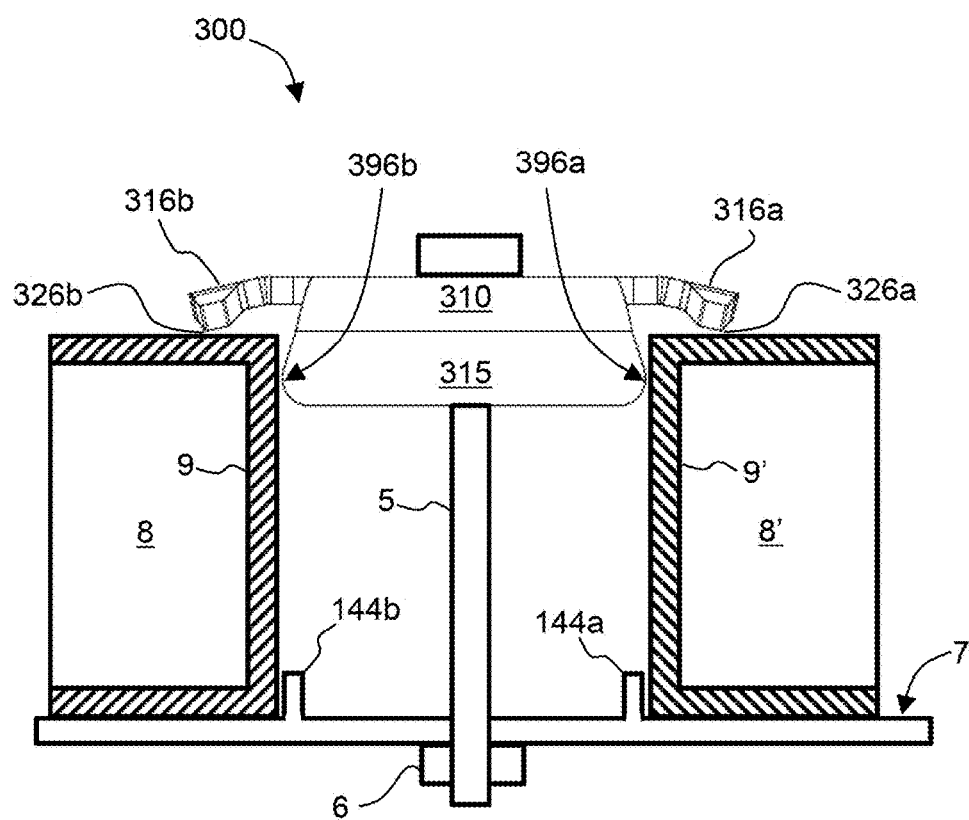
FIG. 22B shows an end elevational view of an assembly of a first embodiment of a mid-clamp clamping a pair of PV modules, according to the present invention.

FIG. 22B shows an end elevational view of an assembly of the first embodiment of a mid-clamp 300 clamping a pair of PV modules 8, 8', according to the present invention. Bolt 5 applies a clamping force through clamp 300 to hold PV modules 8 and 8' down to support surface 7 by way of contact between the head of the bolt and the plane 310. Nut 6 is removable. Sufficient clamping force is applied so that sharp points 326b and 326a at the ends of the spring arms 316b, 316a penetrate the anodized coating of PV module frame 9 and 9', respectively. Downfacing tab 315 of clamp 300 comprises a left-facing and right facing distal end 396a,b, which each has a bulging, semi-circular profile. This bulging, semi-circular profile abuts against the upper distal edges of frames 9, 9' of PV modules 8, 8' and helps to align the clamp 300 up against module frames 9, 9' during installation. Upstanding vertical tabs 144a, 144b on the support surface 7 facilitate positioning of the PV modules 8, 8' prior to clamping.

Figure 23:
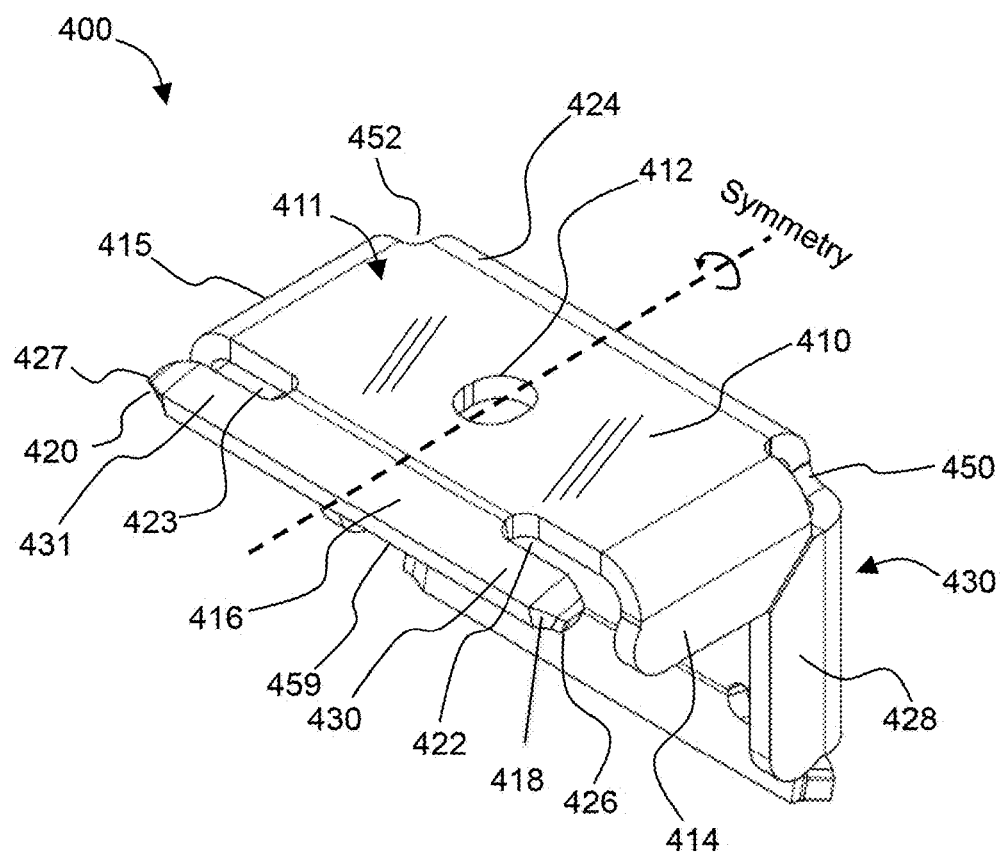
FIG. 23 shows an upper perspective view of a first embodiment of an end-clamp, according to the present invention.

FIG. 23 shows an upper perspective view of a first embodiment of an end-clamp 400, according to the present invention. End-clamp 400 comprises a pair of plates 410 and 430 that are monolithic and integrally joined together along one side to form a single-piece, "L"-shaped construction. Plate 430 is oriented perpendicular to plate 410. End-clamp 400 is "universal" in that it can be oriented in either a horizontal or vertical orientation. In other words, end-clamp 400 can be oriented with either (a) plate 410 or (b) plate 430 being oriented parallel to the glass surface of a PV module that is being attached to the mounting bracket. This provides for two different options for PV module thickness. Plate 410 defines a first aperture 412 for receiving a threaded fastener, and plate 430 defines a second aperture 432 for receiving a threaded fastener (only one aperture is used at a time). Apertures 412 and 432 can be defined as a circular hole, or as an elongated slot as shown in FIG. 23, to provide adjustability in placing the fastener. End-clamp 400 further comprises a first pair of downfacing tabs 414 and 415 located on opposite ends of horizontal plate 410; and a second pair of downfacing tabs 428 and 429 located on opposite ends of vertical plate 430. The downfacing tabs serve to align and space-apart adjacent PV modules by a predetermined distance (e.g., 1⅜" inches). Corner 424 is a continuous segment of end-clamp 400 that is disposed in-between plate 410 and 430.

Referring still to FIG. 23, plate 410 further comprises a two-pronged spring arm 416 located on one side of plate 410. Disposed in opposite directions along spring arm 416 is a pair of short prong arms (prongs) 430 and 431. Disposed at the distal end of each prong 430 and 431 is a downturned end 418 and 420. Each downturned end 418 and 420 has a truncated square shape, and a plurality of corresponding sharp points 426 and 427, respectively, which serves to penetrate the anodized coating of an anodized aluminum substrate, thereby creating a good electrical contact and a good electrical bonding path between pairs of objects connected by the end-clamp 400. Note: the upper face 411 of plate 410 can be seen in this view.

Figure 24:
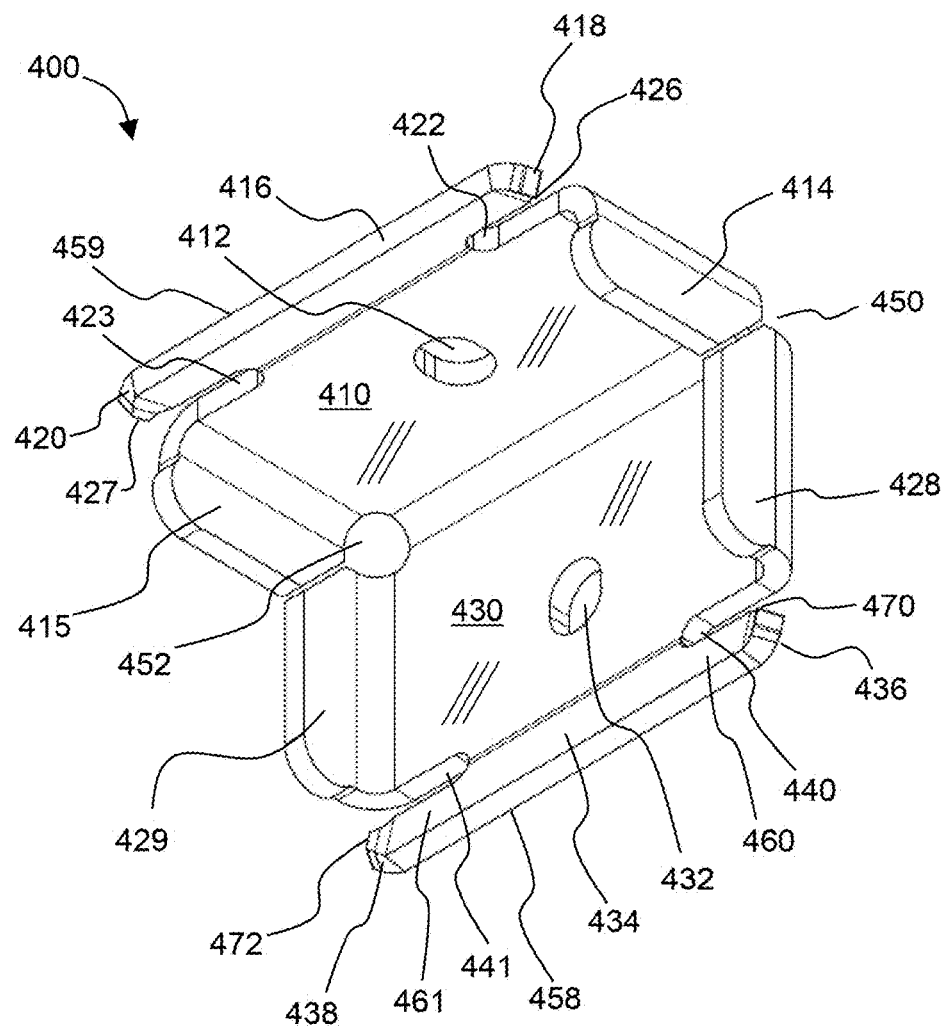
FIG. 24 shows a lower perspective view of a first embodiment of an end-clamp, according to the present invention.

FIG. 24 shows a lower perspective view of the first embodiment of an end-clamp 400, according to the present invention. Plate 430 further comprises a two-pronged spring arm 434 located on one side of plate 430. Disposed in opposite directions along spring arm 434 is a pair of prong arms (prongs) 460 and 461. Disposed at the distal end of each prong 460 and 461 is a downturned end 436 and 438, respectively. Each downturned end 436 and 438 has a truncated square shape and a plurality of corresponding sharp points 470 and 472, respectively, which serves to penetrate the anodized coating of an anodized aluminum substrate, thereby creating a good electrical contact and a good electrical bonding path between pairs of objects connected by the end-clamp 400.

Referring to FIGS. 23 and 24, disposed in-between prongs 430 and 431 and plate 410 are semi-circular recesses 422 and 423, respectively. Likewise, disposed in-between prongs 460 and 461 and plate 430 are semi-circular recesses 440 and 441, respectively. These recesses serve to reduce stress concentrations in the clamping plates 410 and/or 430) when clamp 400 is loaded (depending on its orientation). Another purpose of these recesses is to release the short prong arms 430, 432 and 460, 461, from constraining plates 410 and 430, respectively, to allow for a greater bending compliance (i.e., spring action). Cutout circular recesses 450 and 452 are disposed at the corners of end-clamp 400 where plate 410 intersects plate 430. The curved circular recesses 450 and 452 serve to reduce stress concentrations.

Figure 25:
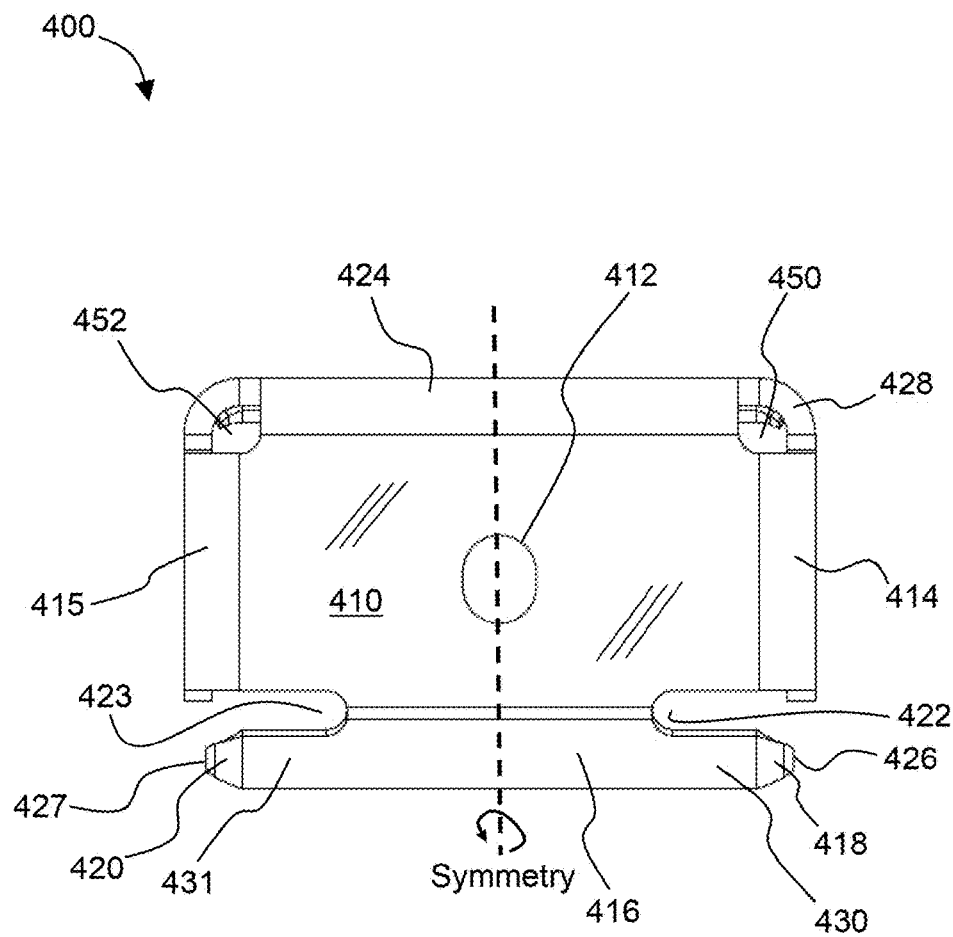
FIG. 25 shows a top plan view of a first embodiment of an end-clamp, according to the present invention.

FIG. 25 shows a top plan view of the first embodiment of an end-clamp 400, according to the present invention. The plate 410, first aperture 412, downfacing tabs 414, 415, spring arms 416, 424, recesses 422, 423, downturned ends 418, 420 of the prong arms 430, 431, sharp points 426, 427, downfacing tabs 428, and circular recesses 450, 452 are all indicated.

Figure 26:
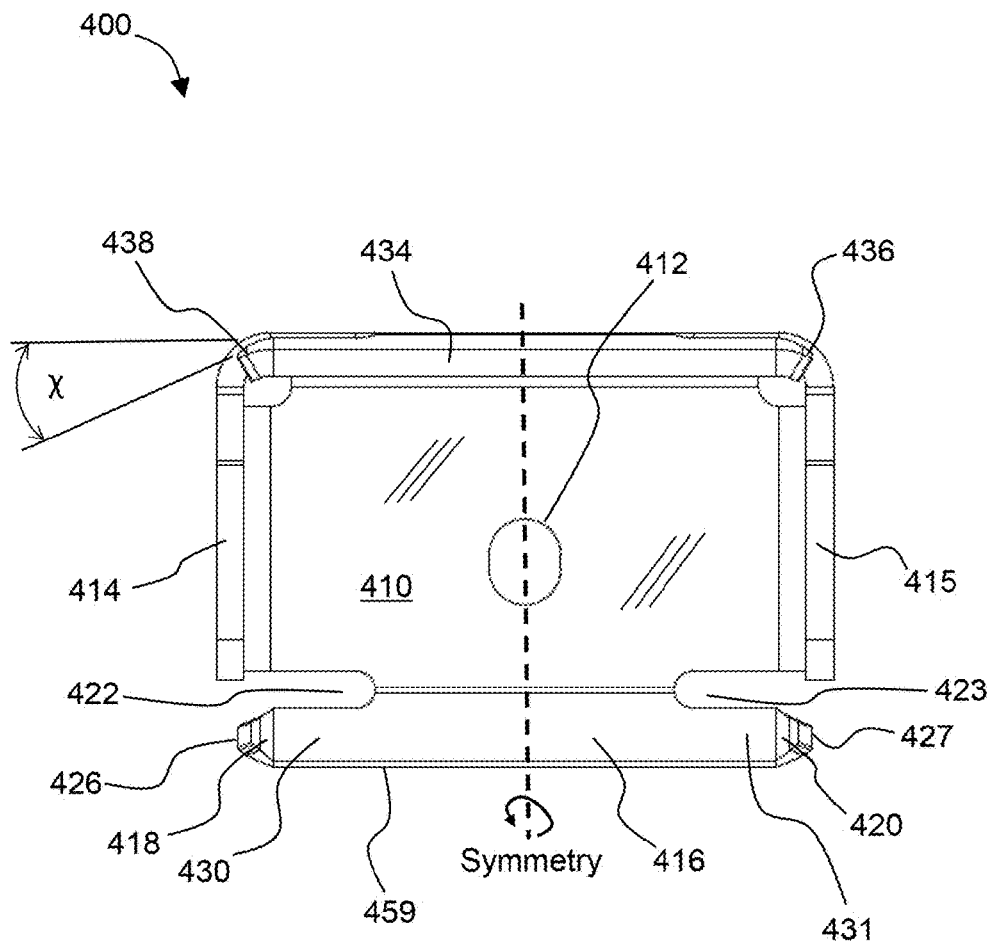
FIG. 26 shows a bottom plan view of a first embodiment of an end-clamp, according to the present invention.

FIG. 26 shows a bottom plan view of the first embodiment of an end-clamp, according to the present invention, with reference numbers indicating elements of the clamp 400 described previously.

Figure 27A:
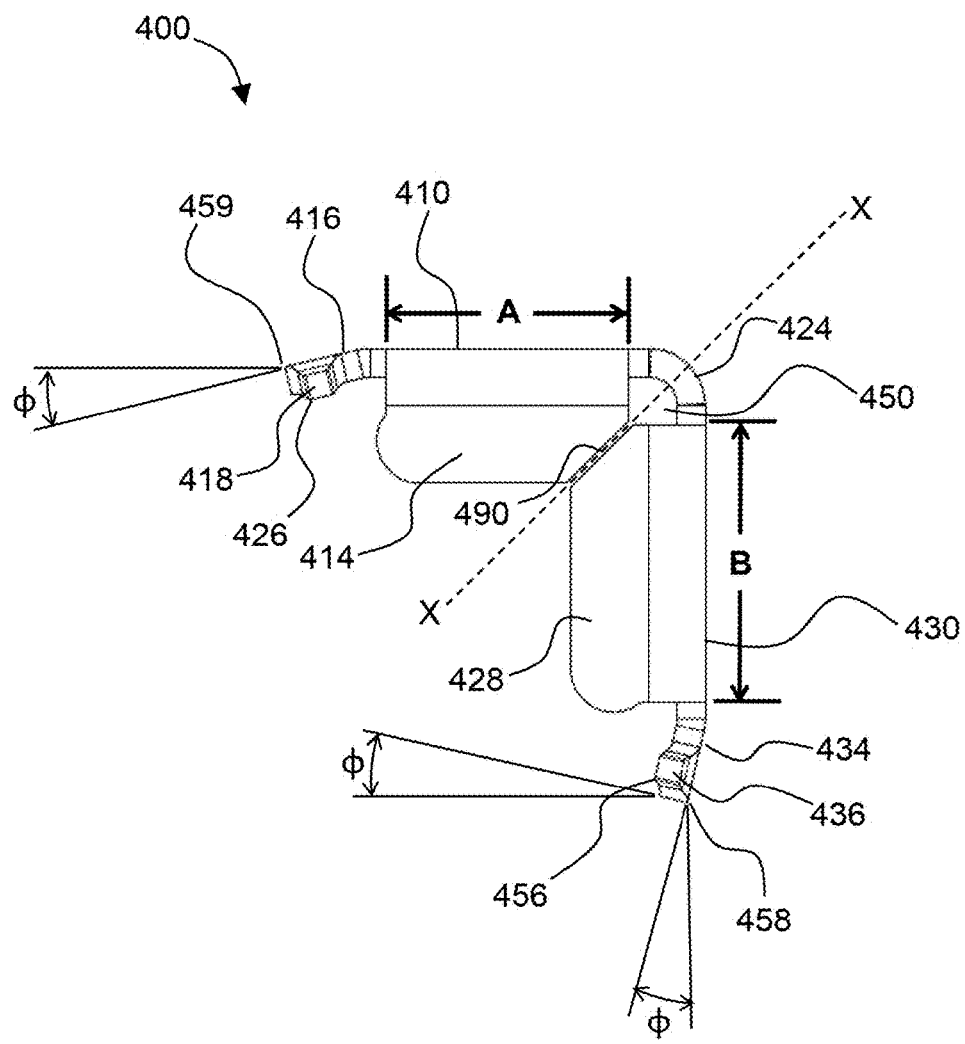
FIG. 27A shows a side elevational view of a first embodiment of an end-clamp, according to the present invention.

FIG. 27A shows a side elevational view of the first embodiment of an end-clamp, according to the present invention. Dimensions A and B are shown. The length of dimension A can be the same as the length of dimension B (in which case end-clamp 400 is symmetric across the dashed line marked as "X-X"). Alternatively, the length of dimension B can be greater than the length of dimension A by an additional amount, ranging from 10-30% of dimension A. The inside corners of downfacing tabs 414 and 428 are angled at 45 degrees at common intersection line 490. Spring arms 416 and 434 are tilted at an angle, $\phi$, which can range from 10-30 degrees (with a preferred angle of 20 degrees), to ensure good contact between the sharp points 426 and 456 at the distal ends 418 and 436 and the substrate. Downturned, square truncated ends 418 and 436 comprise sharp points 426 and 456, respectively, for upper plate 410 and lower plate 430. FIG. 27A also shows sharp edges 459 and 458, which run along the length of spring arms 416 and 434, respectively.

Figure 27B:
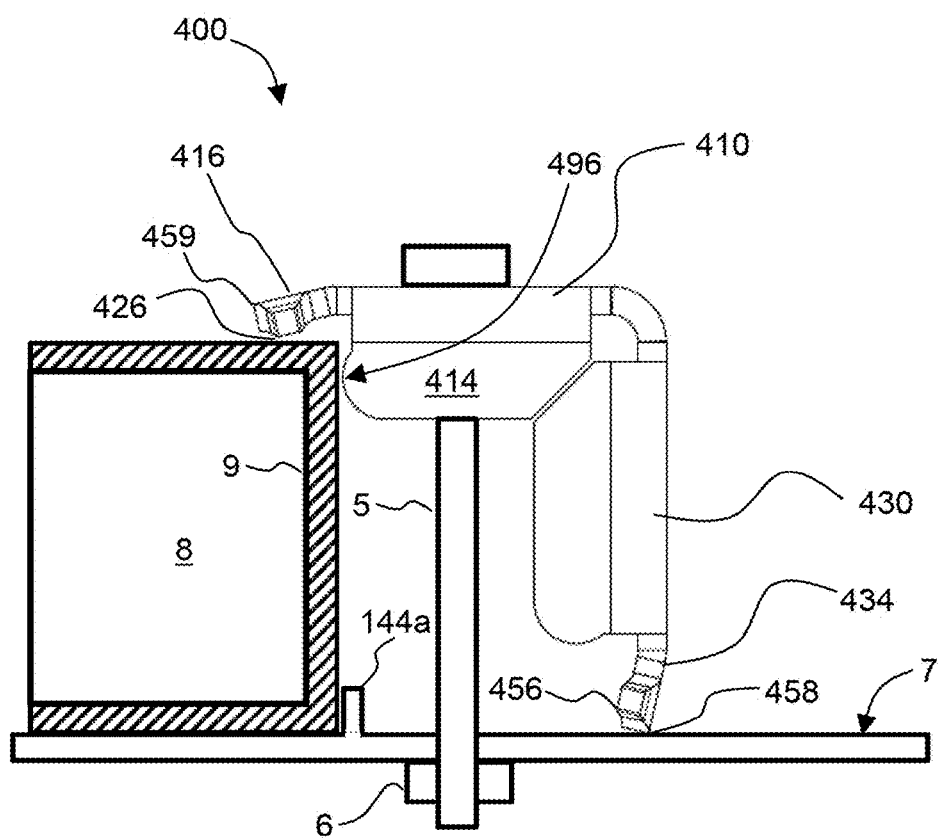
FIG. 27B shows a side elevational view of an assembly of a first embodiment of an end-clamp clamping a PV module, according to the present invention.

FIG. 27B shows a side elevational view of an assembly of the first embodiment of an end-clamp 400 clamping a PV module 8 to a substrate 7 (e.g., a bracket), according to the present invention. When clamped, sharp-ends 426 and 458 of spring arms 416 and 434, respectively, penetrate the anodized coating of frame 9 and aluminum substrate 7 and make a good (low resistance) electrical contact. Vertical tab 144*a* serves to abut and align the distal end of frame 9 of PV module 8. Downfacing tab 414 of clamp 400 comprises a left-facing distal end 496, which has a bulging, semi-circular profile. This bulging, semi-circular profile abuts against the upper distal edge of frame 9 of PV module 8, and helps to align the clamp 400 up against module frame 9 during installation. Threaded bolt 5 and nut 6, when tightened, applies a compressive, clamping force that rigidly holds PV module 8 to substrate 7. Nut 6 can be a captured, self-clinching nut, such as a "PEM" nut. Clamp 400 is removable by removing nut 6 from bolt 5. Note: all of the clamps of the present invention are removable by removing the nut from the bolt. Other reference numbers included in FIG. 27B identify elements discussed previously.

Figure 28:
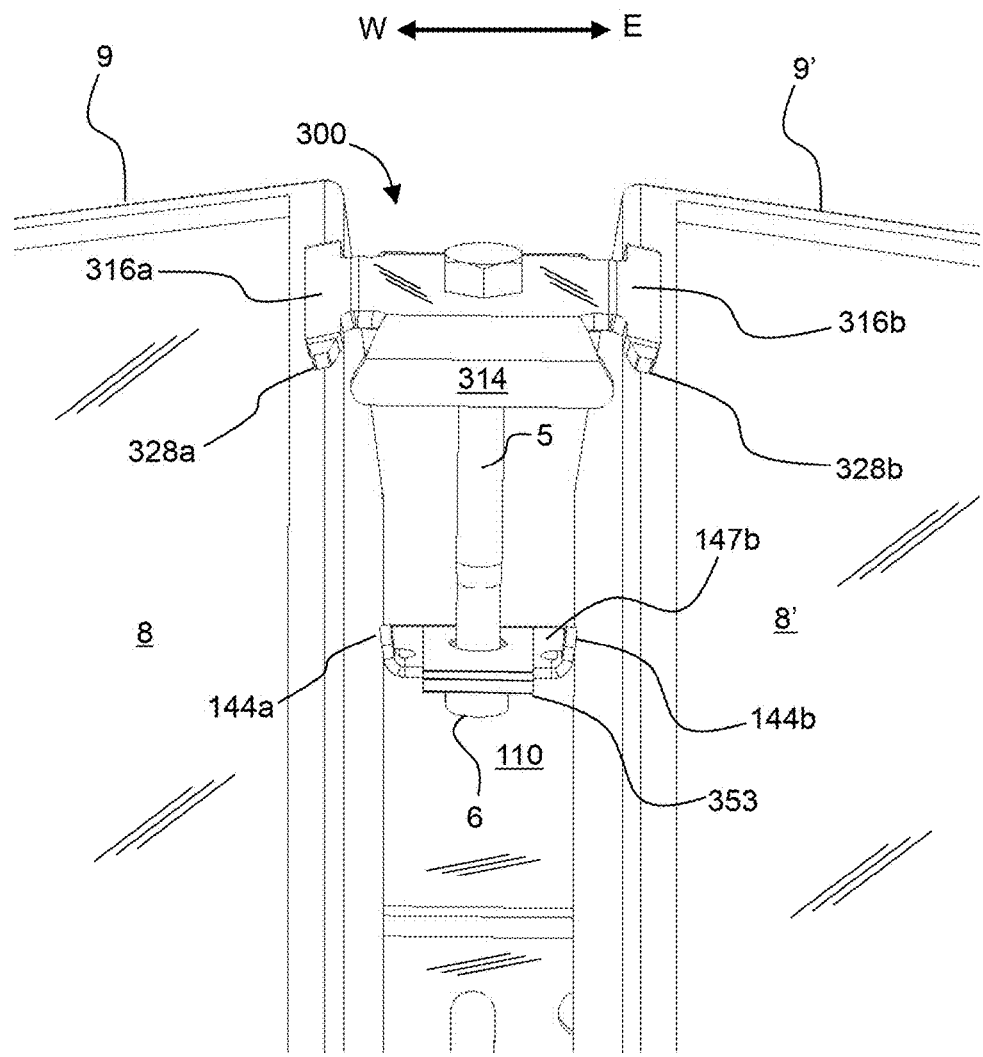
FIG. 28 shows a perspective view of an assembly of a first embodiment of a mid-clamp clamping a pair of PV modules in an East-West Dual-Tilt configuration, according to the present invention.

FIG. 28 shows a perspective view of an assembly of a first embodiment of a mid-clamp 300 clamping a pair of PV modules 8, 8' to a Ridge bracket 110, in an East-West, Dual-Tilt configuration, according to the present invention. Spring arms 316*a* and 316*b* contact the perimeter frame 9, 9' of PV modules 8 and 8', respectively. Sharp points 328*a* and 328*b* penetrate the anodized coating of the perimeter frames 9 and 9', respectively, to make good electrical contact. Threaded bolt 5 is held by self-clinching PEM nut 6 (with self-clinching feature 353). Spacing tabs 144*a*, *b* space apart PV modules 9 and 9' by a pre-determined distance.

Figure 29:
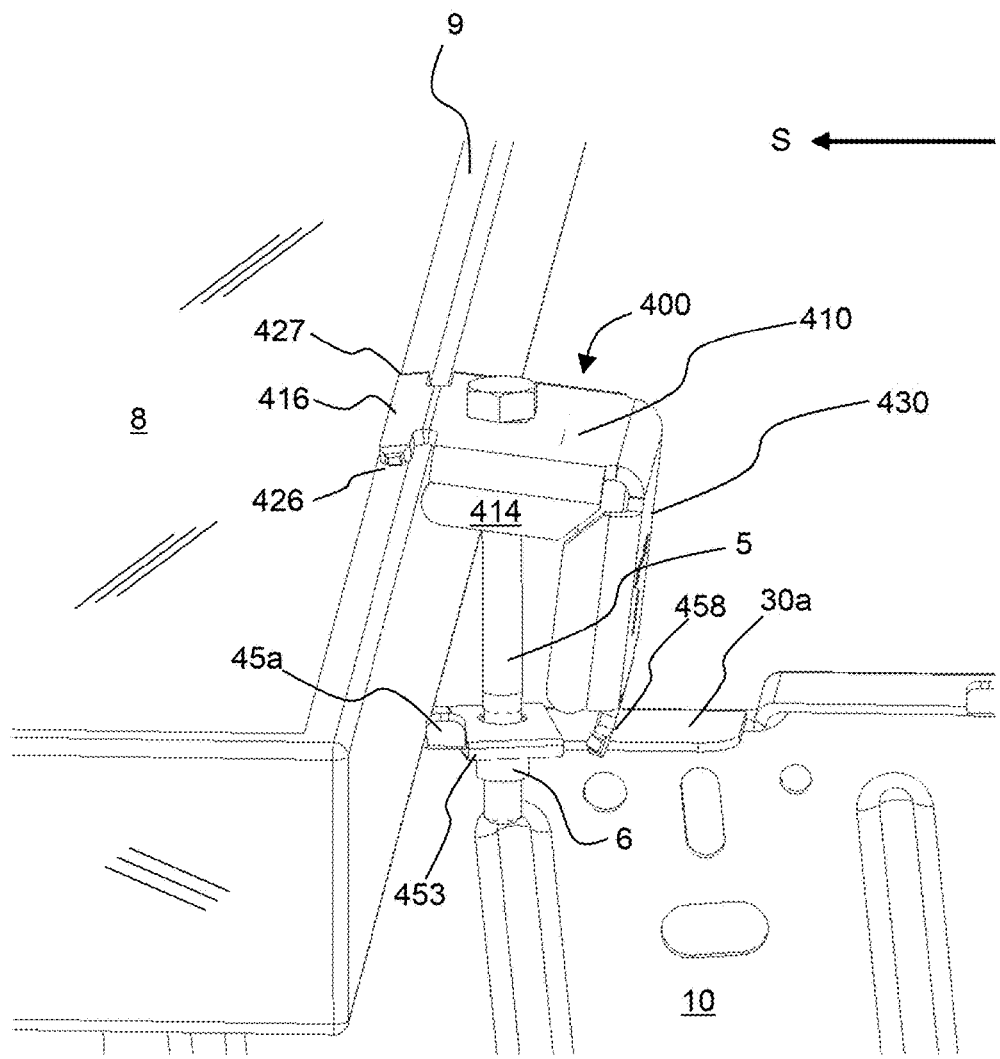
FIG. 29 shows a perspective view of an assembly of a first embodiment of an end-clamp clamping a PV module in a North-South (5 degree) configuration, according to the present invention.

FIG. 29 shows a perspective view of an assembly of a first embodiment of an end-clamp 400 clamping a PV module 8 to a South 5 bracket 10, in a North-South (5 degree tilt) configuration, according to the present invention. The distal ends of spring arm 416 contacts the perimeter frame 9 of PV module 8. Sharp points 426 and 427 penetrate the anodized coating of the perimeter frame 9 and make good electrical contact. Frame 9 butts up against alignment tab 45*a* of mounting tab 30*a*. The sharp edge 458 of lower leg 430 of clamp 400 rests against (and bites into) mounting tab 30*a* of bracket 10. Bolt 5 is held by self-clinching PEM nut 6, with self-clinching feature 453.

Figure 30:
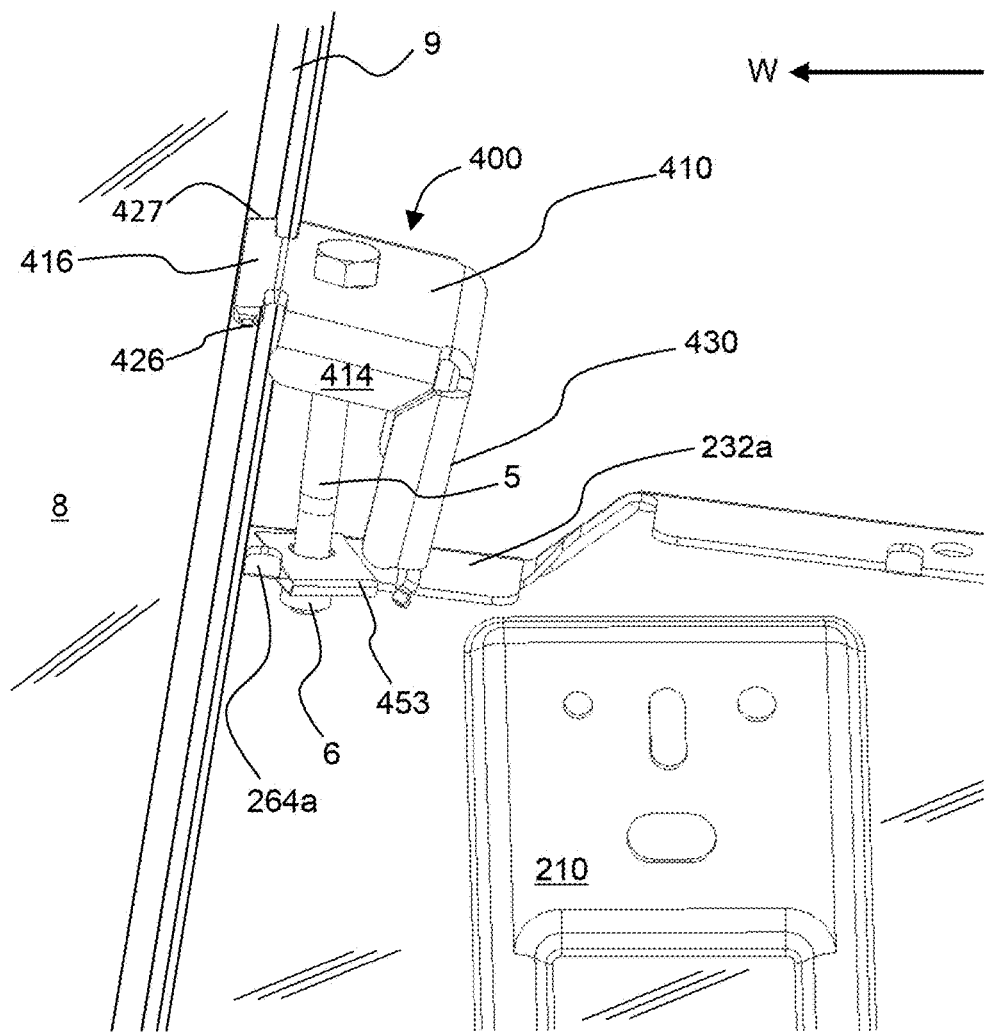
FIG. 30 shows a perspective view of an assembly of a first embodiment of an end-clamp clamping a PV module in an East-West Dual-Tilt configuration, according to the present invention.

FIG. 30 shows a perspective view of an assembly of a first embodiment of an end-clamp 400 clamping a PV module 8 to a Valley bracket 210, in an East-West Dual-Tilt configuration, according to the present invention. The distal ends of spring arm 416 contact the perimeter frame 9 of PV module 8. Sharp points 426 and 427 penetrate the anodized coating of the perimeter frame 9 and make good electrical contact. Frame 9 butts up against alignment tab 264*a* of mounting tab 232*a*. The lower leg 430 of clamp 400 rests against (and bites into) mounting tab 232*a* of bracket 10. Bolt 5 is held by self-clinching PEM nut 6 with self-clinching feature 453.

Figure 31:
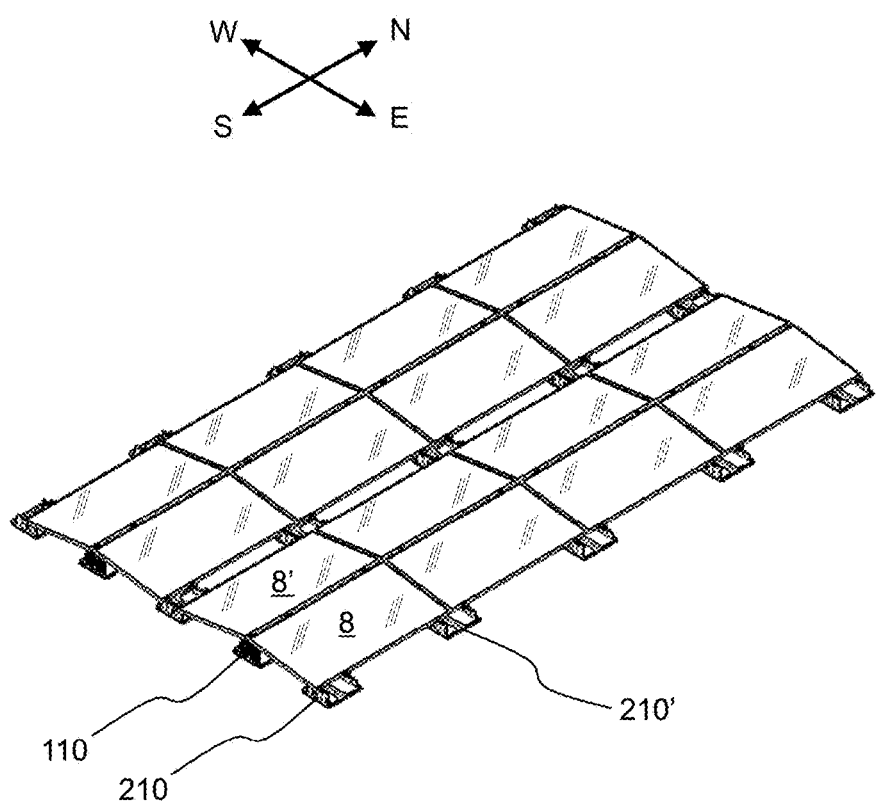
FIG. 31 shows a perspective view of an array of PV modules laid out in an East-West Dual-Tilt configuration using Ridge and Valley brackets, according to the present invention.

FIG. 31 shows a perspective view of an array of multiple PV modules 8, 8', etc. laid out in an East-West Dual-Tilt configuration using rows of Ridge 110 brackets and Valley 210 brackets, according to the present invention. The array of PV modules is tilted at 8 degrees to the horizontal, which optimizes power output for a limited area. Note: ballast blocks are not shown in this example.

In general, with simple rectangular PV Arrays, brackets that are located in the interior of the Array (i.e., brackets that are not on the exterior perimeter of the Array), have four PV modules attached to each bracket; mounted at the corners of each PV module. Brackets that are located along an exterior perimeter edge of the Array have two PV modules attached to each bracket. Finally, brackets located at the four corners of the Array have a single PV module attached to it. Very little amount of the brackets extend beyond the outer perimeter of the PV Array.

Figure 32:
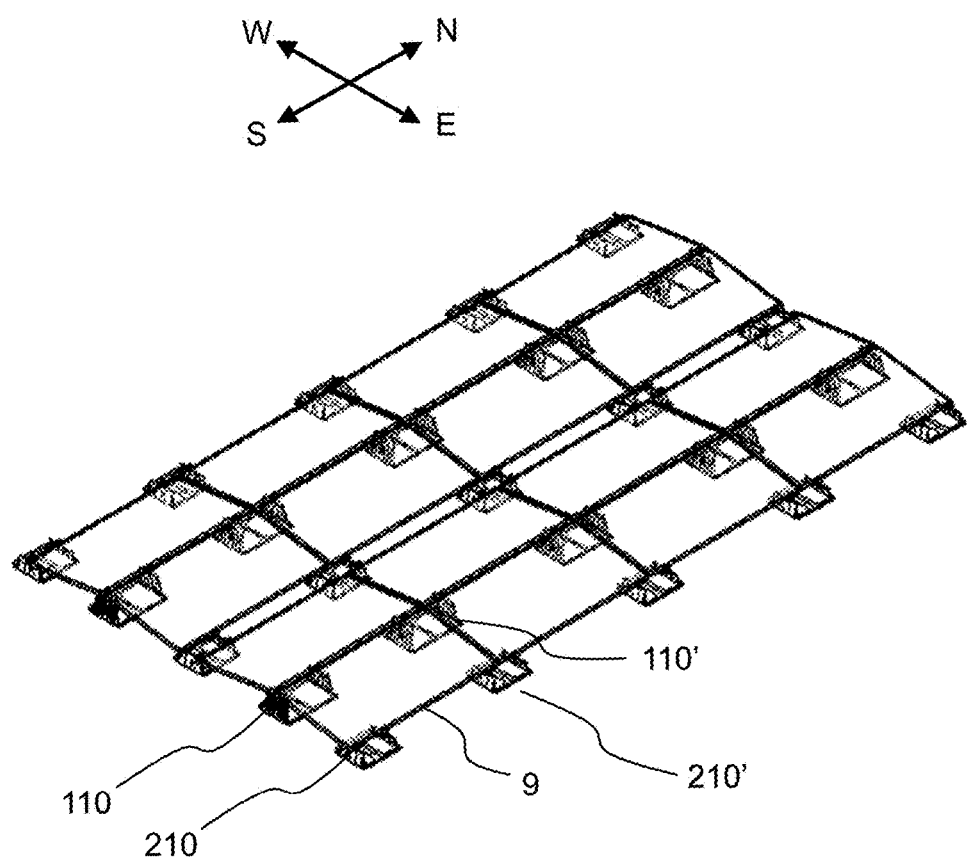
FIG. 32 shows a perspective view of an array of PV modules laid out in an East-West Dual-Tilt configuration using Ridge and Valley brackets, according to the present invention, wherein the PV modules are transparent.

FIG. 32 shows a perspective view of an array of multiple PV modules laid out in an East-West Dual-Tilt configuration using rows of Ridge 110, 110' and Valley 210, 210' brackets, according to the present invention, wherein the PV modules are transparent in this view. The East-West array of PV modules is tilted at 8 degrees to the horizontal, which optimizes power output, for a limited area. Note: ballast blocks are not shown in this example.

Figure 33:
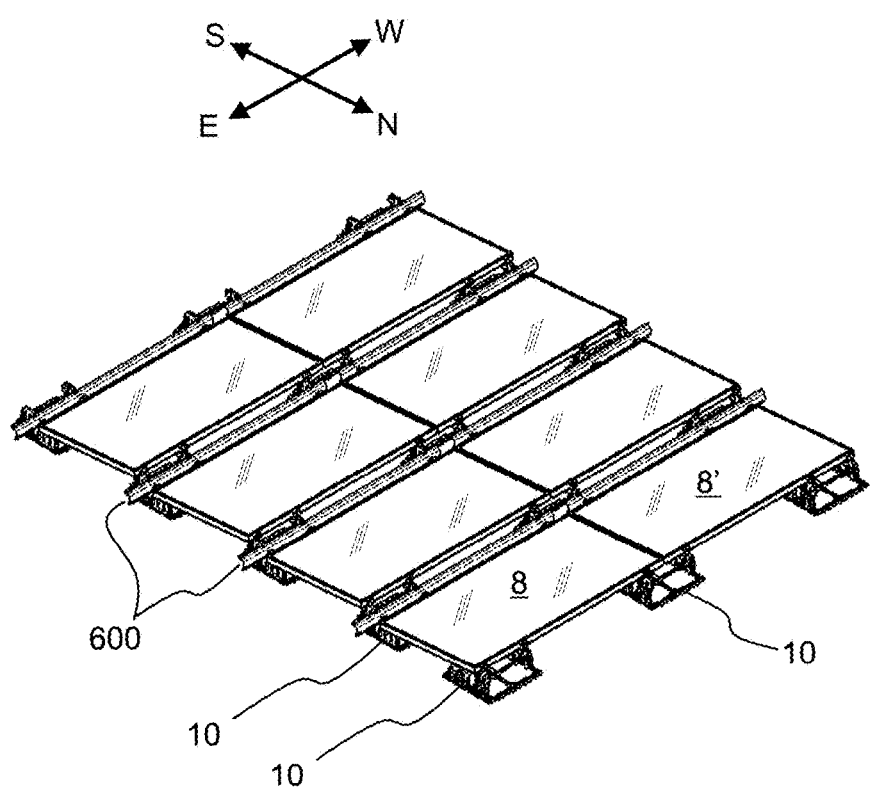
FIG. 33 shows a perspective view of an array of PV modules laid out in a North-South (5 degrees) configuration using South-5 brackets, according to the present invention.

FIG. 33 shows a perspective view of an array of multiple PV modules 8, 8', etc. laid out in a North-South configuration (with panels tilted at 5 degrees) using South-5 brackets 10, according to the present invention. Wind deflector 600 is mounted in the East-West direction to a plurality of brackets 10. Note: ballast blocks are not shown in this example.

Figure 34:
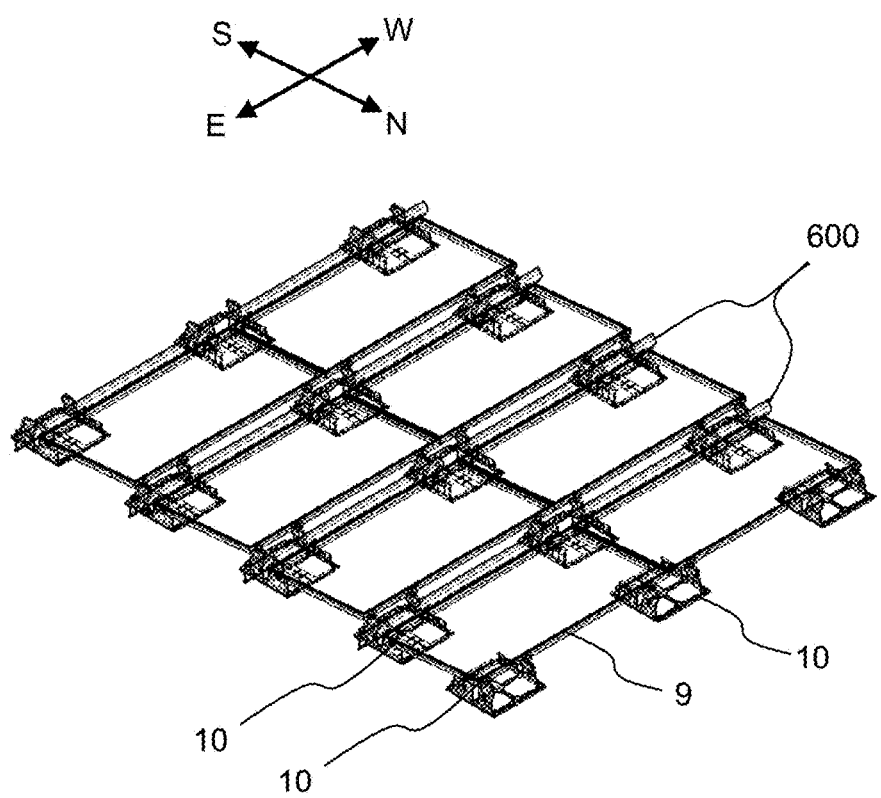
FIG. 34 shows a perspective view of an array of PV modules laid out in a North-South (5 degrees) configuration using South-5 brackets, according to the present invention, wherein the PV modules are transparent

FIG. 34 shows a perspective view of an array of multiple PV modules 8, 8', etc. laid out in a North-South (5 degrees) configuration using South-5 brackets 10, according to the present invention, wherein the PV modules are transparent. Wind deflector 600 is mounted in the East-West direction to a plurality of South-5 brackets 10. Note: ballast blocks are not shown in this example.

Figure 35:
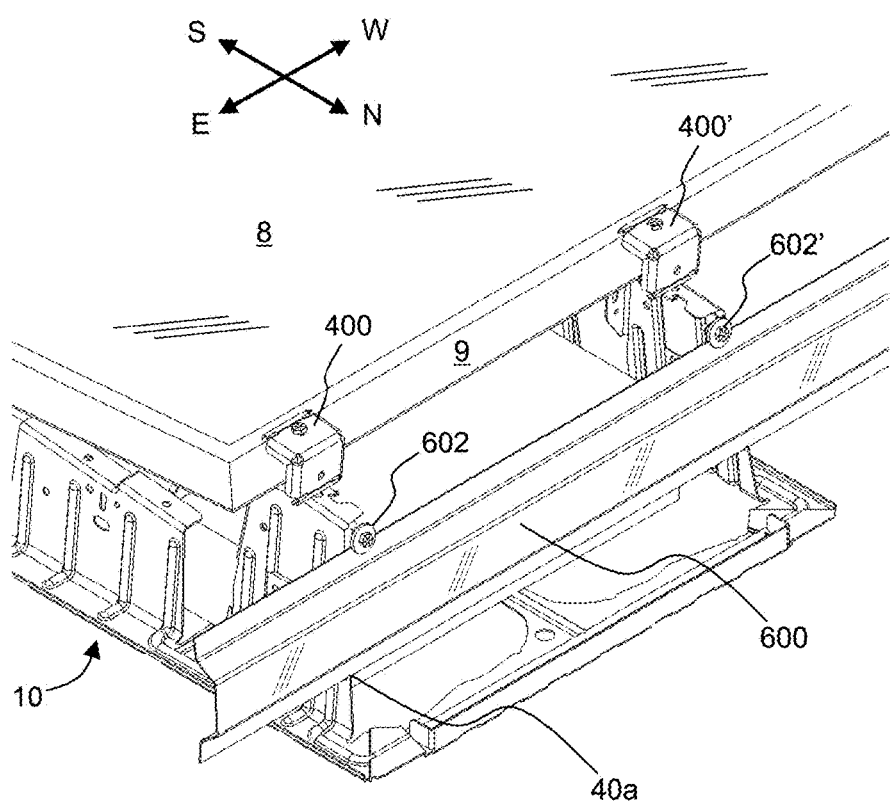
FIG. 35 shows a perspective view of an assembly of a first embodiment of a PV module clamped to a South-5 bracket with a wind deflector in a North-South (5 degree) configuration, according to the present invention.

FIG. 35 shows a perspective view of an assembly of a first embodiment of a PV module 8 clamped to a South-5 bracket 10 with a wind deflector 600, using a North-South (5 degree) configuration, according to the present invention. Deflector 600 spans across multiple support legs 16*a*, 16*b*, etc.

Figure 36:
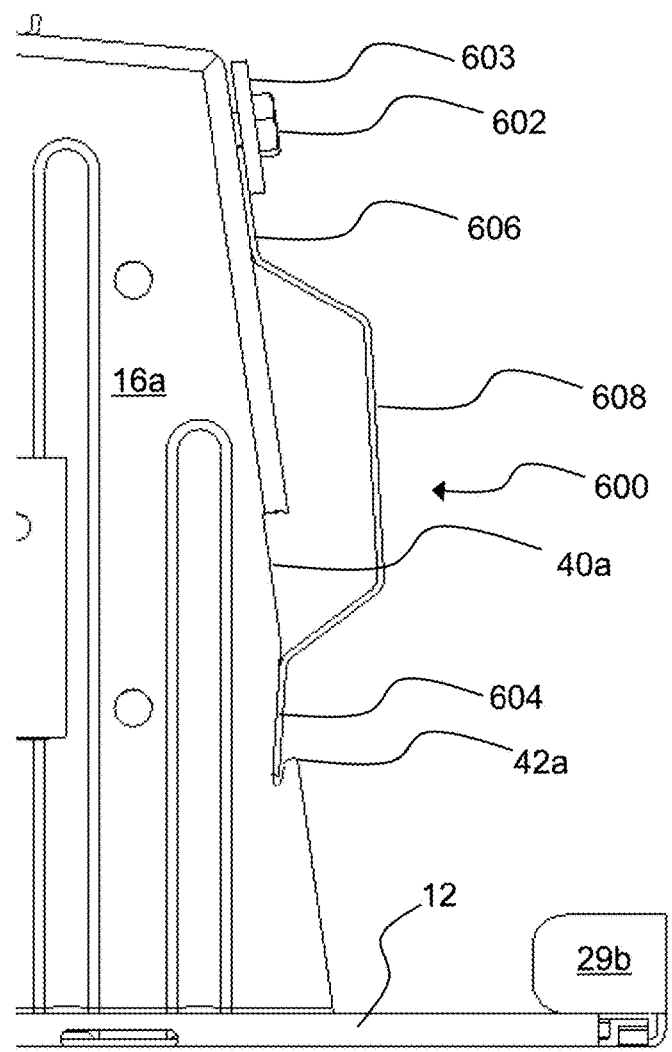
FIG. 36 shows a side elevational view of an assembly of a wind deflector attached to a South-5 bracket, according to the present invention.

FIG. 36 shows a side elevational view of an assembly of a wind deflector 600 attached to a South-5 bracket 10, according to the present invention. Wind deflector 600 comprises a U-shaped profile, with upper 606 and lower portions 604 that are substantially vertical, attached to a substantially vertical middle portion 608. The lower portion 604 slides/slips into a notch (hook) 42*a* of the lower portion of support leg 16*a*, and the upper portion 606 of deflector 600 is bolted to the upper part of support leg 16*a* with bolt 602 and washer 603. Bolt 602 is received by hole 53*a* in side mount 52a of leg 16a, which can use a self-clinching PEM nut (not shown). In this way, deflector 600 is mounted to bracket 10 using a tool-less "clamp and capture" type of mount, where the lower portion 604 is mounted without using any tools.

Figure 37:
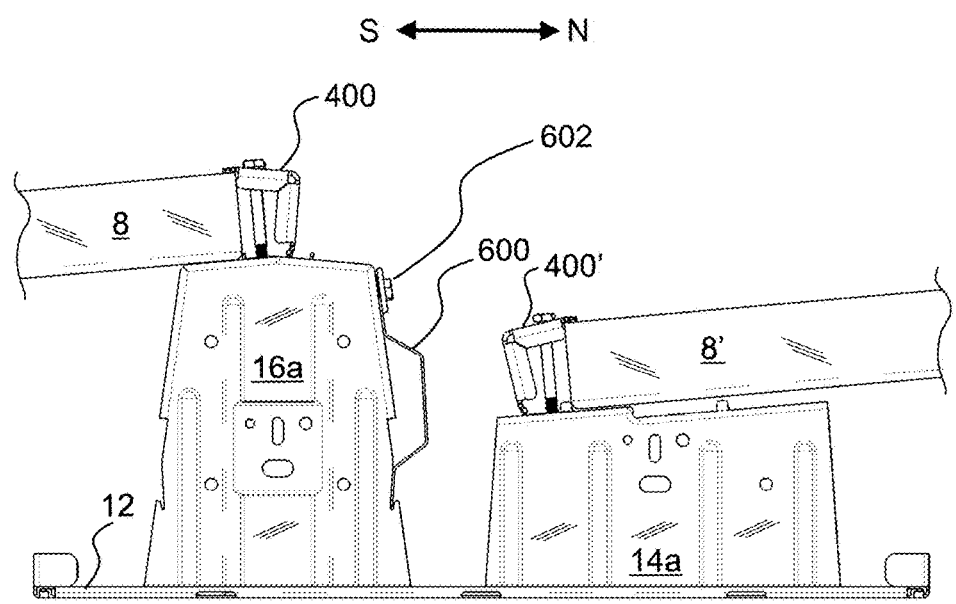
FIG. 37 shows a side elevational view of an assembly of a pair of PV modules and wind deflector attached to a South-5 bracket, according to the present invention.

FIG. 37 shows a side elevational view of an assembly of a pair of PV modules 8, 8' and wind deflector 600 attached to the North side of a tall leg 16a of a South-5 bracket 10 using end-clamps 400 and 400', respectively, according to the present invention.

Figure 38:
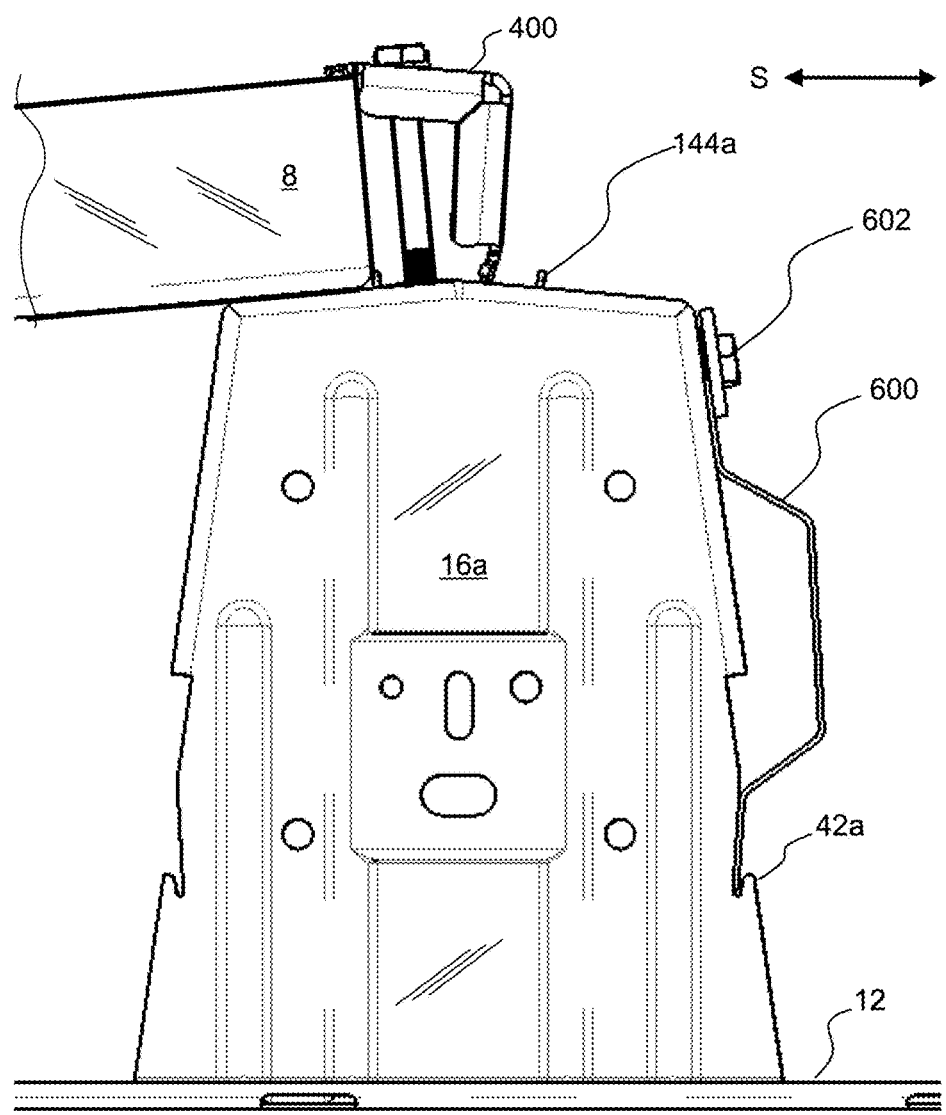
FIG. 38 shows a close-up, side elevational view of an assembly of a PV module and wind deflector attached to a South-5 bracket, according to the present invention.

FIG. 38 shows a close-up, side elevational view of an assembly of a PV module 8 and wind deflector 600 attached to the North side of a tall support leg 16a of South-5 bracket 10, according to the present invention.

Figure 39:
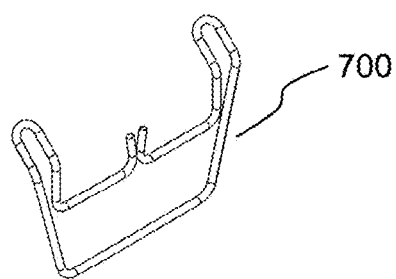
FIG. 39 shows a perspective view of a first embodiment of a wire management clip, according to the present invention, for slipping on to a South-5 wind deflector.

FIG. 39 shows a perspective view of a first embodiment of a wire management clip (loop) 700, according to the present invention, for clipping onto an upper portion 606 of a South-5 wind deflector 600 (not shown). Clip 700 can be used to hold power output cables (not shown) of the PV module(s).

Figure 40:
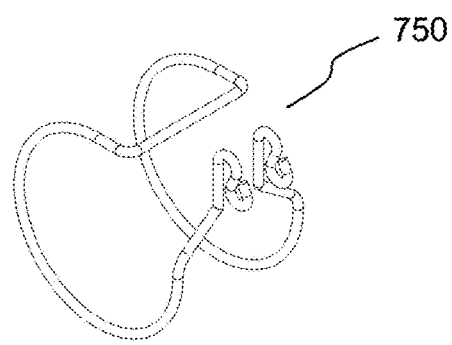
FIG. 40 shows a perspective view of a second embodiment of a wire management clip, according to the present invention, that fits into all types of brackets.

FIG. 40 shows a perspective view of a second embodiment of a wire management clip (loop) 750, according to the present invention, that fits into all three types of brackets (South-5 10, Ridge 110, and Valley 210). Clip 750 can be used to hold power output cables of the PV module(s).

Figure 41:
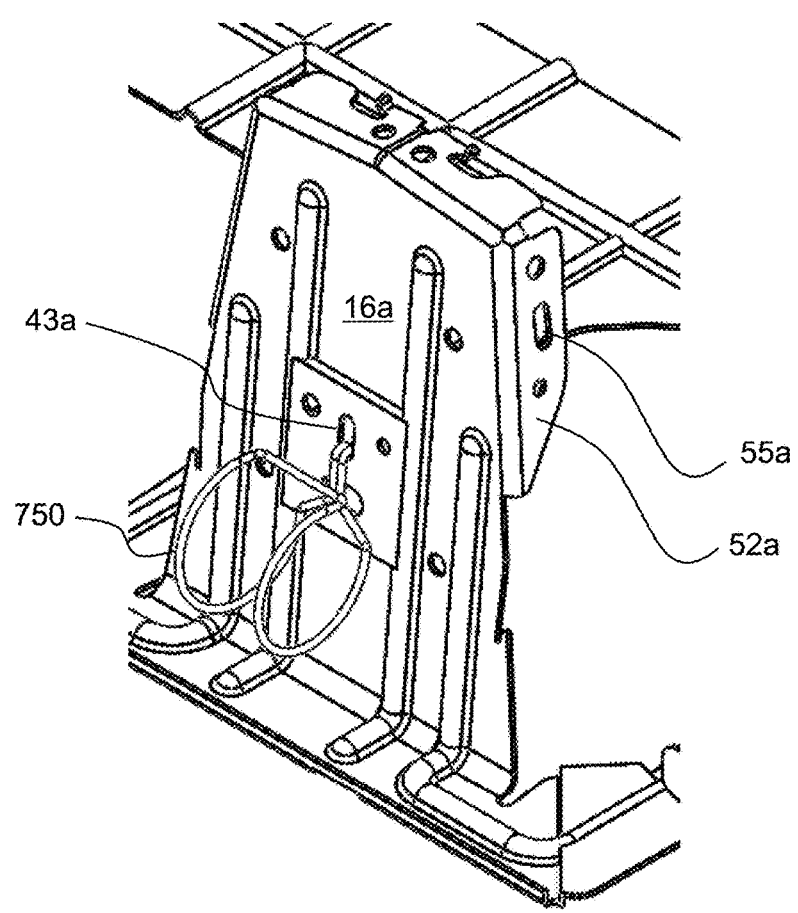
FIG. 41 shows a perspective view of a second embodiment of a wire management clip that is clipped into a South-5 bracket, according to the present invention, that fits into all types of brackets.

FIG. 41 shows a perspective view of the second embodiment of a wire management clip (loop) 750 that is clipped into a support leg 16a of South-5 bracket 10, according to the present invention. The free ends of wire clip 750 slip into vertical slot 43a disposed in leg 16a. Optionally, clip 750 can be installed in vertical slot 55a in side mounting plate 52a. Clip 750 can be used to hold power output cables (not shown) of the PV module(s).

Figure 42A:
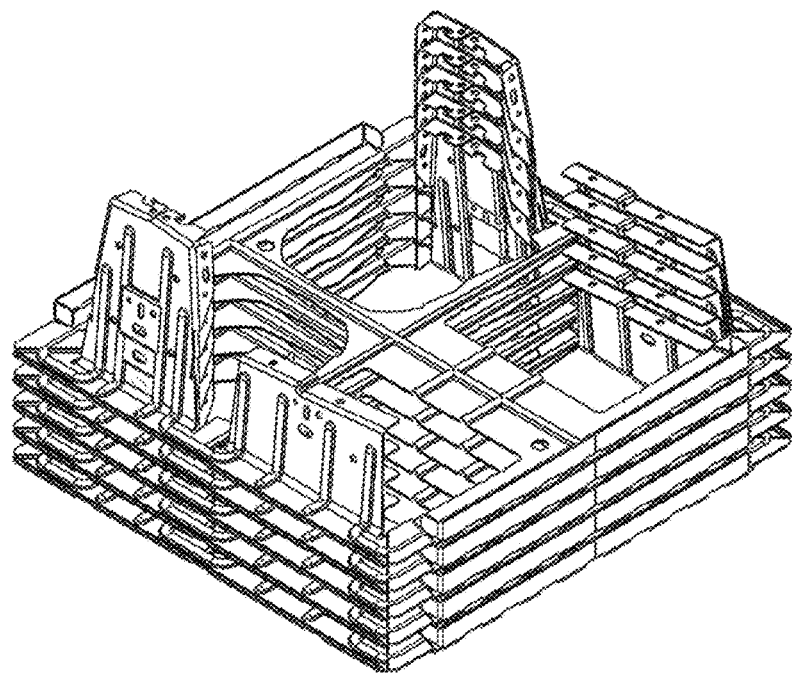
FIG. 42A shows a perspective view of a stacked group of monolithic North-South brackets (South-5 embodiment), according to the present invention.

FIG. 42A shows a perspective view of a stacked group of monolithic North-South brackets (South-5 embodiment), according to the present invention. The plurality of brackets are closely nested in a group and stacked with a tight spacing.

Figure 42B:
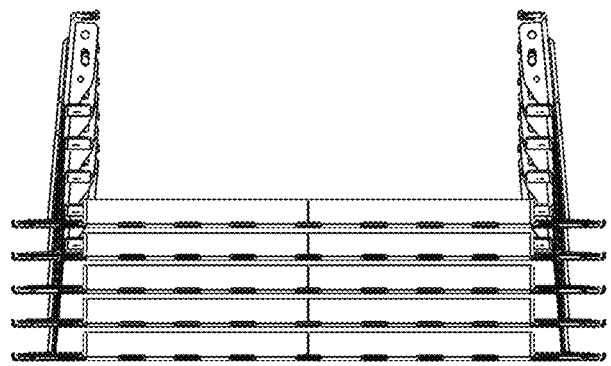
FIG. 42B shows a side elevational of a stacked group of monolithic North-South brackets (South-5 embodiment), according to the present invention.

FIG. 42B shows a side elevational of a stacked group of monolithic North-South brackets (South-5 embodiment), according to the present invention. The plurality of brackets are closely nested in a group and stacked with a tight spacing.

Figure 43A:
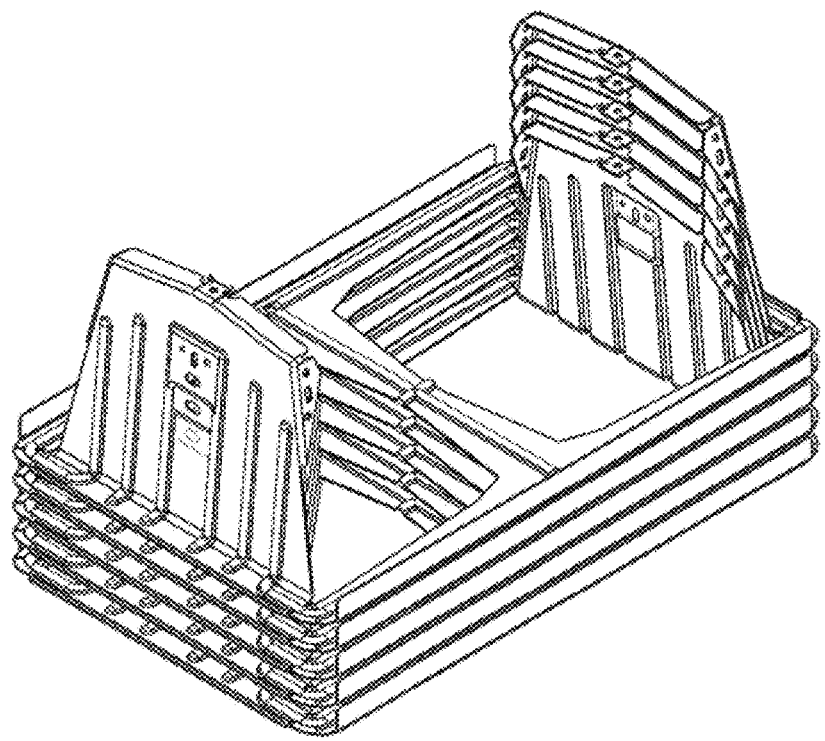
FIG. 43A shows a perspective view of a stacked group of monolithic East-West Dual-Tilt brackets (Ridge embodiment), according to the present invention.

FIG. 43A shows a perspective view of a stacked group of monolithic East-West Dual-Tilt brackets (Ridge embodiment), according to the present invention. The plurality of brackets are closely nested in a group and stacked with a tight spacing.

Figure 43B:
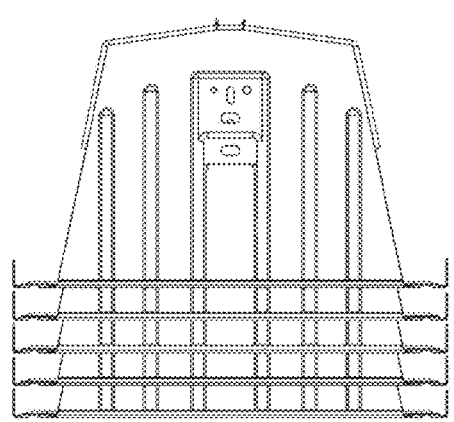
FIG. 43B shows a side elevational of a stacked group of monolithic East-West Dual-Tilt brackets (Ridge embodiment), according to the present invention.

FIG. 43B shows a side elevational of a stacked group of monolithic East-West Dual-Tilt brackets (Ridge embodiment), according to the present invention. The plurality of brackets are closely nested in a group and stacked with a tight spacing.

Figure 44A:
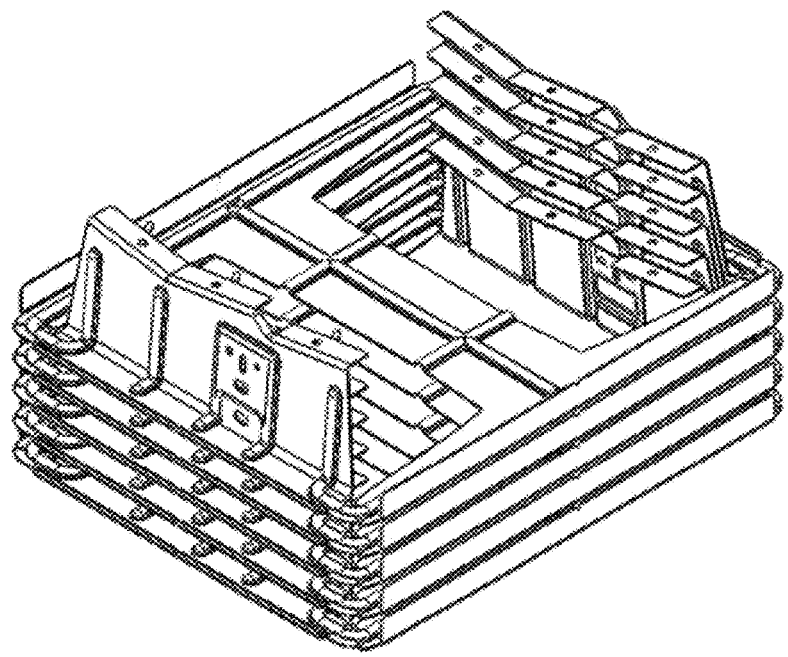
FIG. 44A shows a perspective view of a stacked group of monolithic East-West Dual-Tilt brackets (Valley embodiment), according to the present invention.

FIG. 44A shows a perspective view of a stacked group of monolithic East-West Dual-Tilt brackets (Valley embodiment), according to the present invention. The plurality of brackets are closely nested in a group and stacked with a tight spacing.

Figure 44B:
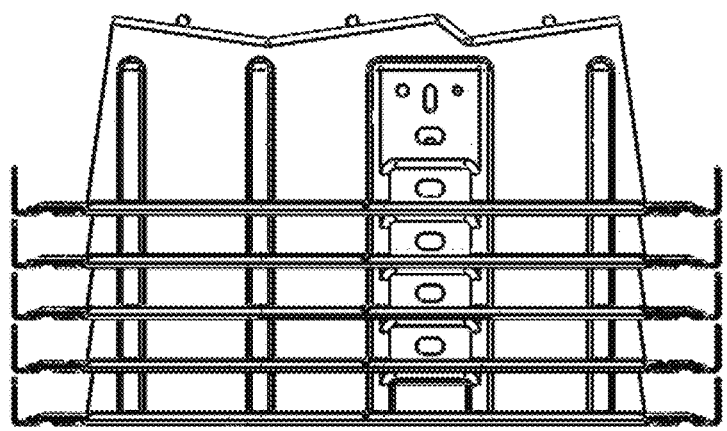
FIG. 44B shows a side elevational of a stacked group of monolithic East-West Dual-Tilt brackets (Valley embodiment), according to the present invention.

FIG. 44B shows a side elevational of a stacked group of monolithic East-West Dual-Tilt brackets (Valley embodiment), according to the present invention. The plurality of brackets are closely nested in a group and stacked with a tight spacing.

Dual-Tilt Valley brackets 210 are sized to hold 1-2 standard concrete ballast blocks, while the Dual-Tilt Ridge brackets 110 can hold 1-5 ballast blocks, depending on how the blocks are oriented. South-5 brackets 10 can hold 1-2 ballast blocks.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An integral, monolithic mounting bracket for supporting a corner of a photovoltaic (PV) module, the bracket comprising:
   a ballast tray for holding one or more ballast blocks;
   a plurality of monolithic support legs that are disposed at an acute angle from a plane of the ballast tray and that are integral with the ballast tray; and
   a plurality of clamp assemblies, each clamp assembly comprising a bolt and a clamp;
   wherein each clamp comprises a plurality of sharp points for piercing a non-conductive coating of a photovoltaic module frame and creating an electrical bonding path;
   wherein each support leg comprises a plurality of integral, monolithic module mounting tabs, wherein each tab defines a hole for receiving a fastener from a clamping assembly.

2. An integral, monolithic mounting bracket for supporting a corner of a photovoltaic (PV) module, the bracket comprising:
   a ballast tray for holding one or more ballast blocks;
   a plurality of monolithic support legs that are disposed at an acute angle from a plane of the ballast tray and that are integral with the ballast tray; and
   five module mounting tabs per support leg, with three tabs being oriented at a shallow angle with respect to a horizontal plane and pointed towards a first end of the bracket, and with two tabs being oriented at the same shallow angle with respect to the horizontal plane and pointed towards a second end of the bracket opposite to the first end of the bracket;
   wherein each support leg comprises a plurality of integral, monolithic module mounting tabs, wherein each tab defines a hole for receiving a fastener from a clamping assembly.

3. An integral, monolithic mounting bracket for supporting a corner of a photovoltaic module, the bracket comprising:
   a ballast tray for holding one or more ballast blocks defining a plurality of empty spaces; and
   a plurality of monolithic support legs, having shapes substantially corresponding to the plurality of empty spaces, that are disposed at an acute angle from a horizontal plane of the ballast tray and that are integral with the ballast tray, wherein the legs lean inwards towards a center of the bracket; and
   a plurality of metallic clamp assemblies to clamp the photovoltaic module in place on the support legs, each clamp assembly attached to the support leg with a bolt and a clamp;
   wherein the acute angle ranges from 75-89 degrees;
   wherein the bracket is symmetric across a plane of symmetry that: (a) is oriented perpendicular to the plane of the ballast tray, and (b) is located in a middle of the ballast tray;
   wherein two or more brackets are stackable in a nested group;

wherein the bracket is made of sheet metal; and wherein each clamp comprises a plurality of rigid sharp metallic points for piercing a non-conductive anodized aluminum coating of a photovoltaic module frame and creating an electrical bonding path.

4. An integral, monolithic mounting bracket for supporting a corner of a photovoltaic module, the bracket comprising:

a ballast tray for holding one or more ballast blocks; and a plurality of monolithic support legs that are disposed at an acute angle from a plane of the ballast tray and that are integral with the ballast tray;

wherein the acute angle is 85 degrees;

wherein two or more brackets are stackable in a nested group;

wherein the bracket is made of galvanized steel sheet metal;

wherein each support leg comprises a plurality of vertical stiffening ribs;

wherein the ballast tray comprises a plurality of horizontal stiffening ribs;

further comprising a pair of vertical edges disposed on a perimeter of the ballast tray;

wherein each support leg comprises a plurality of integral, monolithic module mounting tabs, each tab defining a hole for receiving a fastener from a clamping assembly;

wherein each module mounting tab is angled at a shallow angle with respect to the plane of the ballast tray, wherein the shallow angle is 5 degrees;

wherein each module mounting tab is oriented perpendicular to its support leg;

wherein the ballast tray defines a plurality of leftover empty spaces in the ballast tray corresponding to material that is stamped and bent-up for the support legs;

further comprising a plurality of clamp assemblies, each clamp assembly comprising a bolt and a clamp; wherein each clamp comprises a plurality of sharp points for piercing a non-conductive coating of a PV module frame and creating an electrical bonding path; and further comprising a side mount support flange disposed vertically on a side of a support leg and oriented perpendicular to said leg.

5. The integral, monolithic mounting bracket of claim 4, wherein the bracket is symmetric across a plane of symmetry that: (a) is oriented perpendicular to the plane of the ballast tray, (b) is oriented parallel to a first direction, and (c) is located in a middle of the ballast tray.

6. The integral, monolithic mounting bracket of claim 4, wherein the bracket is symmetric across a plane of symmetry that: (a) is oriented perpendicular to the plane of the ballast tray, and (b) is located in a middle of the ballast tray.

7. The integral, monolithic mounting bracket of claim 6, and wherein the bracket is also symmetric across a plane of symmetry that: (a) is oriented perpendicular to the plane of the ballast tray, (b) is oriented parallel to a second direction perpendicular to the first direction, and (c) is located in the middle of the ballast tray.

8. A method of forming an integral, monolithic mounting bracket for supporting a corner of a photovoltaic module and clamping the photovoltaic module in place, the method comprising:

(a) providing a rectangular-shaped sheet of metal, the sheet defining a plane;

(b) stamping at least two identical sections of metal from the sheet, with each section being cut along three sides, leaving an uncut fourth side remaining, in a pattern that leaves a continuous rim of metal along a perimeter of the sheet;

(c) bending-up each section on its remaining uncut fourth side into a near-vertical position to form a ballast tray defining a plurality of empty spaces, whereby each bent-up section forms a monolithic support leg inclined inwards toward another monolithic support leg, having a shape substantially corresponding to one of the plurality of empty spaces, disposed at an acute angle from a plane disposed inside of a ballast tray, and forming the bracket with the ballast tray for holding one or more ballast blocks and mounting tabs angled at a shallow angle with respect to a horizontal plane; and (d) clamping the photovoltaic module in place on the support legs with a plurality of clamp assemblies, each clamp assembly attached to a support leg with a bolt and a clamp comprising a plurality of rigid, sharp points for piercing a non-conductive coating of a photovoltaic module frame and creating an electrical bonding path.

9. The method of claim 8, further comprising: (d) bending-down a plurality of mounting tabs at an angle that is perpendicular to a corresponding support leg, and (e) drilling a hole through each mounting tab for receiving a bolt of a clamping assembly.

10. An integral, monolithic mounting bracket for support a corner of a photovoltaic (PV) module, the bracket comprising:

a ballast tray for holding one or more ballast blocks;

a plurality of monolithic support legs that are disposed at an acute angle from a horizontal plane disposed inside of the ballast tray, and that are integral with the ballast tray; and a plurality of clamping assemblies, each clamping assembly comprising a bolt and a clamp;

wherein each clamp comprises a plurality of sharp points for piercing a non-conductive coating of a photovoltaic module frame and creating an electrical bonding path;

wherein a rim is disposed around a ballast tray perimeter; and wherein each support leg comprises a plurality of integral, monolithic module mounting tabs, and each tab defines a hole for receiving a fastener from one of said clamping assemblies.

\* \* \* \* \*